United States Patent
Nihei et al.

(10) Patent No.: US 7,181,294 B2
(45) Date of Patent: Feb. 20, 2007

(54) VIBRATION CONTROL DEVICE

(75) Inventors: Ryo Nihei, Fujiyoshida (JP); Tetsuaki Kato, Hadano (JP); Soichi Arita, Minamitsuru-gun (JP)

(73) Assignee: Fanuc Ltd, Yamanashi (JP)

( * ) Notice: Subject to any disclaimer, the term of this patent is extended or adjusted under 35 U.S.C. 154(b) by 101 days.

(21) Appl. No.: 11/101,497

(22) Filed: Apr. 8, 2005

(65) Prior Publication Data

US 2005/0228513 A1    Oct. 13, 2005

(30) Foreign Application Priority Data

Apr. 8, 2004  (JP)  ............................. 2004-114290

(51) Int. Cl.
  *G05B 13/02*  (2006.01)
(52) U.S. Cl. ............................. 700/30; 700/28; 700/29; 700/31; 700/44; 318/561; 318/568.12; 318/615; 318/617; 703/2
(58) Field of Classification Search ............ 700/28–31, 700/44–45, 170, 279–280; 318/561, 611, 318/568.12, 615–617; 703/2
See application file for complete search history.

(56) References Cited

U.S. PATENT DOCUMENTS

| | | | |
|---|---|---|---|
| 4,943,759 A |  | 7/1990 | Sakamoto et al. ...... 318/568.11 |
| 5,637,969 A | * | 6/1997 | Kato et al. .................... 318/432 |
| 5,914,830 A | * | 6/1999 | Kadlec et al. ............ 360/78.14 |
| 6,064,167 A | * | 5/2000 | Takenaka et al. ...... 318/568.12 |
| 6,567,711 B1 |  | 5/2003 | Hosek et al. |
| 6,669,459 B2 | * | 12/2003 | Matsubayashi et al. ..... 425/143 |
| 6,796,183 B2 | * | 9/2004 | Noell ........................... 73/593 |

(Continued)

FOREIGN PATENT DOCUMENTS

EP  0 483 367 A1  5/1992

(Continued)

OTHER PUBLICATIONS

Testsuro, Kato, Method for Controlling Servo Loop of Industrial Robot, Patent Abstracts of Japan JP 01296301 A, vol. 14, No. 84, Feb. 1990, p. 1007.

(Continued)

*Primary Examiner*—Ramesh Patel
(74) *Attorney, Agent, or Firm*—Drinker Biddle & Reath LLP

(57) ABSTRACT

A control device for controlling the motion of a movable part in a machine while suppressing vibration generated in the movable part. The control device includes a state-variable estimating section for estimating a state variable of a controlled system in the machine and outputting an estimated state variable; a reference model for outputting an ideal controlled variable for the controlled system; a compensator for calculating a compensation value for correcting a control input for the controlled system, based on a difference between the estimated state variable and the ideal controlled variable; and a feedback control section for determining the control input, based on a deviation between a desired command value and one of the estimated state variable and the ideal controlled variable. A corrected control input obtained by correcting the control input determined through the feedback control section by using the compensation value calculated through the compensator is input to the controlled system as well as to the state-variable estimating section and the reference model.

6 Claims, 22 Drawing Sheets

U.S. PATENT DOCUMENTS

| | | | |
|---|---|---|---|
| 2002/0088678 A1 | 7/2002 | Ruckman et al. | 188/378 |
| 2002/0158180 A1* | 10/2002 | Noell | 248/550 |
| 2003/0139824 A1* | 7/2003 | Akamatsu et al. | 700/29 |
| 2004/0075183 A1* | 4/2004 | Matsubayashi et al. | 264/40.1 |
| 2004/0135534 A1* | 7/2004 | Cullen | 318/609 |
| 2006/0061317 A1* | 3/2006 | Shibata et al. | 318/611 |

FOREIGN PATENT DOCUMENTS

| | | |
|---|---|---|
| EP | 0 523 252 A1 | 1/1993 |
| EP | 102 46 093 C1 | 11/2003 |
| JP | 6-178570 | 6/1994 |
| JP | 7-20940 | 1/1995 |
| JP | 2001-136767 | 5/2001 |
| JP | 2002-287804 | 10/2002 |
| KR | 2003-0029895 A | 7/2000 |
| KR | 189484 Y1 | 7/2000 |

OTHER PUBLICATIONS

Kunio, Miyawaki, Control Method For Robot Device, Patent Abstracts of Japan JP 07121239 A, vol. 1995, No. 8, Sep. 1995.

* cited by examiner

FREQUENCY RESPONSE OF POSITION CONTROL LOOP WITH CURRENT METHOD

STEP RESPONSE OF POSITION LOOP WITH NEW METHOD

STEP RESPONSE OF POSITION LOOP WITH CURRENT METHOD

STEP RESPONSE OF POSITION LOOP WITH NEW METHOD USING ARM VELOCITY

VIBRATION CONTROL DEVICE

BACKGROUND OF THE INVENTION

1. Field of the Invention

The present invention relates to a control device for controlling the motion of a movable part in a machine and, more particularly, to a control device capable of suppressing vibration generated in the movable part.

2. Description of the Related Art

Generally, a movable part in a machine, such as an industrial machine, a machine tool, a robot, or the like, is driven by a driving source through various transmission mechanisms, and the position and speed of the movable part are controlled as in a controlled system. In this connection, the mechanical components, such as the transmission mechanism, interposed between the driving source and the movable part have relatively low rigidity. Accordingly, in a case where the movable part is moved at high speed and stopped at a target position, the movable part tends to vibration easily.

As an example, an actuator for a robot arm will be examined. FIG. 21 shows, by way of example, the configuration of an actuator for a robot arm. In FIG. 21, the robot arm 1 is driven by an electric motor (hereinafter referred to as a motor) 3 through a reduction mechanism 2 comprised of a gear and the like. A control device (not shown) for controlling the motion of the robot arm 1 performs a feedback control of a position and speed by using the position and speed of the robot arm 1 detected by a position/speed detector 4 provided in the motor 3, so as to control the position and speed of the robot arm 1.

The reduction mechanism 2 generally has low rigidity. Therefore, a robot-arm driving system shown in FIG. 21 can be represented, by a two-inertia model shown in FIG. 22, as a block diagram from an electric current (or an input) for the motor 3 to the position and speed (or an output) of the robot arm 1. To simplify the examination, the effects of friction and viscosity are ignored here. In FIG. 22, "i" is a motor current, "$T_q$" is a motor torque, "$\omega_M$" is a motor speed, "$\theta_M$" is a motor position, "$\omega_L$" is an arm speed, "$\theta_L$" is an arm position, "$J_M$" is a motor inertia, "$J_L$" is an arm inertia, "$K_t$" is a motor-torque constant, "K" is a spring constant of a low-rigidity part, and "s" is a Laplace operator.

In the above robot-arm driving system, a semi-closed loop control, such as one shown in FIG. 23, is generally employed to control the position and speed of the robot arm 1. In other words, the motor speed $\omega_M$ and motor position $\theta_M$ detected by the position/speed detector 4 are fed back, so as to perform a loop control for position and speed. More specifically, as shown in FIG. 23, a position deviation is obtained by subtracting the fed-back motor position $\theta_M$ from a position command $\theta_R$, and a speed command is obtained by performing a position loop operation using a position control gain $K_P$ (function). Further, a speed deviation is obtained by subtracting the fed-back motor position $\theta_M$ from the obtained speed command, and an electric-current command "i" is obtained by performing a speed loop operation using a speed control gain $K_v$ (function). Then, the motor 3 is driven by the current command "i".

As the above-described semi-closed loop control is position and speed feedback control for the motor 3, the position and speed of the motor 3 can be well controlled. However, as described, there arises the problem that the robot arm 1 tends to vibrate because of the interposition of a transmission mechanism such as the low-rigidity reduction mechanism 2.

To address this problem, in the field of a machine tool or the like, a fully-closed loop control, such as one shown in FIG. 24, is generally employed. In this system the movable part of the machine, such as the robot arm 1, is equipped with a detector for detecting its position and/or speed and the position and/or speed of the movable part are fed back for control. The block diagram shown in FIG. 24 differs from the block diagram of FIG. 23 in a point that, instead of the motor position $\theta_M$ and the motor speed $\omega_M$, the arm position $\theta_L$ and the arm speed $\omega_L$ are fed back for control. When this fully-closed loop control is employed, it is required that the movable part of the machine, such as the robot arm 1, is equipped with a detector for detecting the position and speed of the movable part.

On the other hand, Japanese Unexamined Patent Publication (Kokai) No. 6-178570 (JP-A-06-178570), for example, discloses a control device based on a semi-closed loop control and including a function for suppressing the vibration of a machine driving system. In this control device, in order to suppress the vibration of the machine, a speed detector and an acceleration detector are provided for the machine to feed back the detected values of the speed and acceleration (i.e., the state variables) of the machine, in addition to the semi-closed loop control, so as to correct a torque command for the motor.

Thus, in a case where a detector is mounted on the movable part of the machine, it is necessary to provide a number of supplementary units, such as a cable and a signal receiving circuit, in order to acquire feedback signals from the detectors, and this may lead to an increase in the overall cost of the system. There is also concern that the maintenance cost of each individual unit may increase. Furthermore, the reliability of the system may degrade due to the increased number of parts.

As another approach, a control method is known in which, instead of providing the detectors for directly detecting the position and speed of the machine's movable part as described above, an observer (or a state-variable estimating section) for estimating the state variable of the movable part is provided in a control circuit, and the position and speed indicated by the state variable estimated by the observer are fed back to control the movable part. As for such a state-feedback type control method, many proposals have been made in relation to a state variable to be estimated and to a feedback technique.

For example, Japanese Unexamined Patent Publication (Kokai) No. 7-20940 (JP-A-07-020940) discloses a control device, performing a semi-closed loop control, which is equipped with an observer for estimating twist angle and twist angular speed between a motor and a mechanical load. This control device corrects a toque command for the motor, by using the twist angle and the twist angular speed estimated by the observer, so as to suppress the vibration of the machine.

The state-feedback control method disclosed in JP-A-07-020940 is mainly intended to stabilize a controlled system, and does not actively cause the state variable to follow up a command or desired value. This will be explained with reference to FIG. 25. FIG. 25 shows, as a block diagram, a system for controlling the position and speed of a machine's movable part, such as a robot arm, as one example of a conventional control system using the state-feedback control method. In the illustrated example, a controlled system is the condition of the motor for driving the movable part.

In the illustrated control system, a speed command is obtained by performing a position loop control using a position control gain $K_p$, based on a deviation between a position command $\theta_R$ and a feedback signal of a motor position $\theta_M$, and a torque command (or an electric-current command) is obtained using a speed control gain $K_v$, based on a deviation between the obtained speed command and a feedback signal of a motor speed $\omega_M$. Then, a correction value for an estimated state variable fed back by the observer is subtracted from the torque command as a control input for the controlled system (or the motor), to determine a corrected torque command, and this corrected torque command is input to the controlled system.

In this configuration, the observer outputs state variables $x_1$ and $x_2$ estimated from the corrected torque command input to the controlled system and the speed $\omega_M$ of the motor as the controlled system. In this case, for example, the estimated state variable $x_1$ is the estimated value of the position $\theta_L$ of the movable part (such as a robot arm), and the estimated state variable $x_2$ is the estimated value of the speed $\omega_L$ of the movable part. These state variables $x_1$ and $x_2$ are multiplied by state feedback gains $K_1$ and $K_2$, respectively, and the resultants thereof are fed back to correct the control input. As can be seen, the illustrated control method does not actively cause the state variables of the controlled system, estimated by the observer, to follow the desired values.

On the other hand, Japanese Unexamined Patent Publication (Kokai) No. 2001-136767 (JP-A-2001-136767) discloses a control device for a linear motor, in which the position and speed at the center of gravity of the movable part of the linear motor are estimated by an observer and the estimated position and speed are fed back to a position controller and a speed controller, respectively, so as to control the movable part.

Further, Japanese Unexamined Patent Publication (Kokai) No. 2002-287804 (JP-A-2002-287804) discloses a control method in which the state variable of a controlled system is estimated by an observer, a reference state variable is determined from a command or desired value by using a reference model, and a difference between the estimated state variable and the reference state variable is fed back to a controller, so as to control the controlled system.

The state-feedback control methods disclosed in these patent documents are configured to actively cause the state variables estimated by the observer to follow the desired values. However, depending on the configuration of the machine to which the method is applied, there may be a case where the controlled system is unstable and a sufficient feedback gain cannot be obtained. Further, the feedback gain needs to be determined in correspondence to the characteristics of the machine, but generally it is difficult to obtain an optimum value for the feedback gain.

SUMMARY OF THE INVENTION

It is an object of the present invention to provide a control device for controlling the motion of a movable part in a machine, wherein it is possible to effectively suppress the vibration of the movable part by performing a state-feedback type control which does not require a vibration detector to be provided on the movable part, and wherein it is possible to ensure a stable response by actively causing the state variable of a controlled system to follow a command or desired value.

To accomplish the above object, the present invention provides a control device comprising a state-variable estimating section for estimating a state variable of a controlled system in a machine and outputting an estimated state variable; a reference model for outputting an ideal controlled variable for the controlled system; a compensator for calculating a compensation value for correcting a control input for the controlled system, based on a difference between the estimated state variable and the ideal controlled variable; and a feedback control section for determining the control input, based on a deviation between a desired command value and one of the estimated state variable and the ideal controlled variable; wherein a corrected control input obtained by correcting the control input determined through the feedback control section by using the compensation value calculated through the compensator is input to the controlled system as well as to the state-variable estimating section and the reference model.

In the above-described control device, the state variable may comprise any one of acceleration, speed and position, and the compensation value may comprise a compensation current or torque.

In this arrangement, if the controlled system comprises a two-inertia system, the state variable may comprise any one of the acceleration, speed and position at a load part in the controlled system.

A transfer function of the compensator may have an inverse characteristic reverse to a characteristic of a transfer function of the reference model.

In this arrangement, the transfer function of the compensator may include a filter incorporated to the inverse characteristic.

The above-described control device is particularly useful in a case where the machine comprises a robot.

BRIEF DESCRIPTION OF THE DRAWINGS

The above and other objects, features and advantages of the present invention will become more apparent from the following description of the preferred embodiments in connection with the accompanying drawings, wherein.

DETAILED DESCRIPTION

Figure 1:
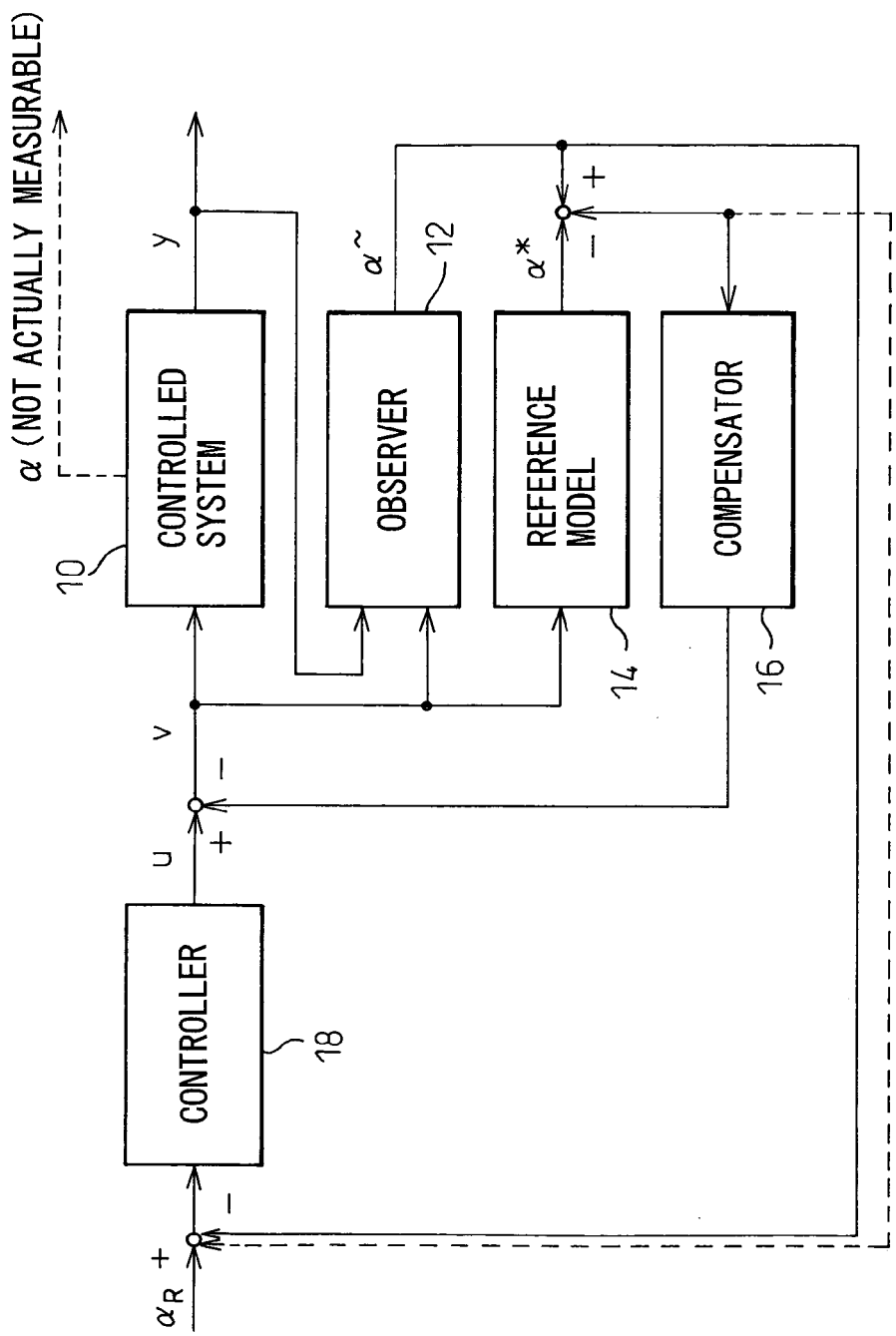
FIG. 1 is a block diagram showing the configuration of a control device according to the present invention.

The embodiments of the present invention are described below, in detail, with reference to the accompanying drawings. Throughout the drawings, the same or similar components are denoted by common reference numerals.

Referring to the drawings, FIG. 1 is a block diagram showing the configuration of a control device according to the present invention. The control device of the present invention includes an observer (i.e., a state-variable estimating section) 12 for estimating a state variable $\alpha$ (which is not actually measurable) representing the internal state of a controlled object or system 10 as a particular part in a machine to be actually controlled, so as to output the estimated state variable $\alpha^\sim$; a reference model 14 for outputting an ideal controlled variable $\alpha^*$ which defines an ideal response value for the controlled system 10; a compensator 16 for calculating a compensation value for correcting a control input "u" for the controlled system 10, based on the difference between the estimated state variable $\alpha^\sim$ and the ideal controlled variable $\alpha^*$; and a controller (i.e., a feedback control section) 18 for determining the control input "u", based on a deviation between a desired command value $\alpha_R$ and either one of the estimated state variable $\alpha^\sim$ or the ideal controlled variable $\alpha^*$.

In one embodiment, the deviation between the desired command value $\alpha_R$ for controlling the controlled system 10 and the estimated state variable $\alpha^\sim$ estimated by the observer 12 is input to the controller 18 (shown by a solid line). Then, a corrected control input "v", obtained by subtracting the compensation value as an output of the compensator 16 from the control input "u" as an output of the controller 18, is supplied as an operational input to the controlled system 10. The corrected control input "v" and the controlled variable "y" of the controlled system 10 are input to the observer 12 which in turn determines the estimated state variable $\alpha^\sim$ of the controlled system 10 based on the corrected control input "v" and the controlled variable "y". The corrected control input "v" is also input to the reference model 14 which in turn determines the ideal controlled variable $\alpha^*$ of the controlled system 10. The compensator 16 determines the correction value for the control input "u", on the basis of the difference obtained by subtracting the ideal controlled variable $\alpha^*$ as an output of the reference model 14 from the estimated state variable $\alpha^\sim$ as an output of the observer 12. The correction value is used to correct the control input "u", so as to determine the corrected control input "v".

According to the control device of the present invention having the above configuration, control is performed so that the ideal controlled variable $\alpha^*$ as the ideal response value of the controlled system 10 coincides with the estimated state variable $\alpha^\sim$ of the controlled system 10 estimated by the observer 12. Further, control is performed in a manner that the estimated state variable $\alpha^\sim$ output from the observer 12 is fed back and the deviation between the desired command value $\alpha_R$ and the estimated state variable $\alpha^\sim$ of the controlled system 10 is input to the controller 18, so as to cause the controlled system 10 to follow the desired command value $\alpha_R$. As a result, the estimated state variable $\alpha^\sim$ of the controlled system 10 estimated by the observer 12 settles to the actual state variable $\alpha$ of the controlled system 10, so that it is possible to cause the state variable $\alpha$ of the controlled system 10 to follow the desired command value $\alpha_R$ with good accuracy.

In the above configuration, if an acceleration is selected as the state variable $\alpha$, it is possible to cause the acceleration of the controlled system 10 to follow the desired command value $\alpha_R$ with good accuracy. Likewise, if a speed or a position is selected as the state variable $\alpha$, it is possible to cause the speed or the position of the controlled system 10 to follow the desired command value $\alpha_R$ with good accuracy. In either case, the compensation value as an output of the compensator 16 is determined as a compensation torque. Furthermore, it is not required, in the invention, to provide a detector on a machine's movable part (e.g., the end portion of a robot arm) for detecting the position, speed or acceleration of the machine's movable part for a control purpose, so that the problems of a cost increase and reliability degradation are solved. Also, the invention ensures that the state variable $\alpha$ of the controlled system 10 is caused to follow the desired command value $\alpha_R$, and thereby that a stable response as directed by the position, speed or acceleration command is achieved while suppressing the generation of vibrations in the machine's movable part.

In the configuration shown in FIG. 1, a transfer function of the compensator 16 can have an inverse characteristic reverse to a characteristic of a transfer function of the reference model 14. According to this configuration, it is possible to make the response characteristic of the state variable α of the controlled system 10 with respect to the corrected control input "v" equal to the response characteristic of the reference model 14. However, a proper function is usually selected as the reference model 14, so that, in the function having the inverse characteristic, the order of the numerator is greater than the order of the denominator. Accordingly, as will be described later, it is desirable that the compensator 16 has, in addition to the inverse characteristic, a filter whose order is greater than the relative order of the function.

In FIG. 1, it is also possible to employ a configuration in which the deviation between the desired command value $\alpha_R$ for the controlled system 10 and the ideal controlled variable $\alpha^*$ as an output of the reference model 14 is input to the controller 18 (shown by a dashed line), instead of the configuration in which the deviation between the desired command value $\alpha_R$ for the controlled system 10 and the estimated state variable $\alpha^\sim$ as an output of the observer 12 is input to the controller 18 (shown by a solid line). This is because the control is performed so that the estimated state variable $\alpha^\sim$ of the controlled system 10 estimated by the observer 12 coincides with the ideal controlled variable $\alpha^*$ of the controlled system 10 output from the reference model 14.

The configuration of a control device according to one embodiment of the present invention, which is applied to an arm control for a robot, will be described with reference to FIGS. 2 to 20.

Figure 2:
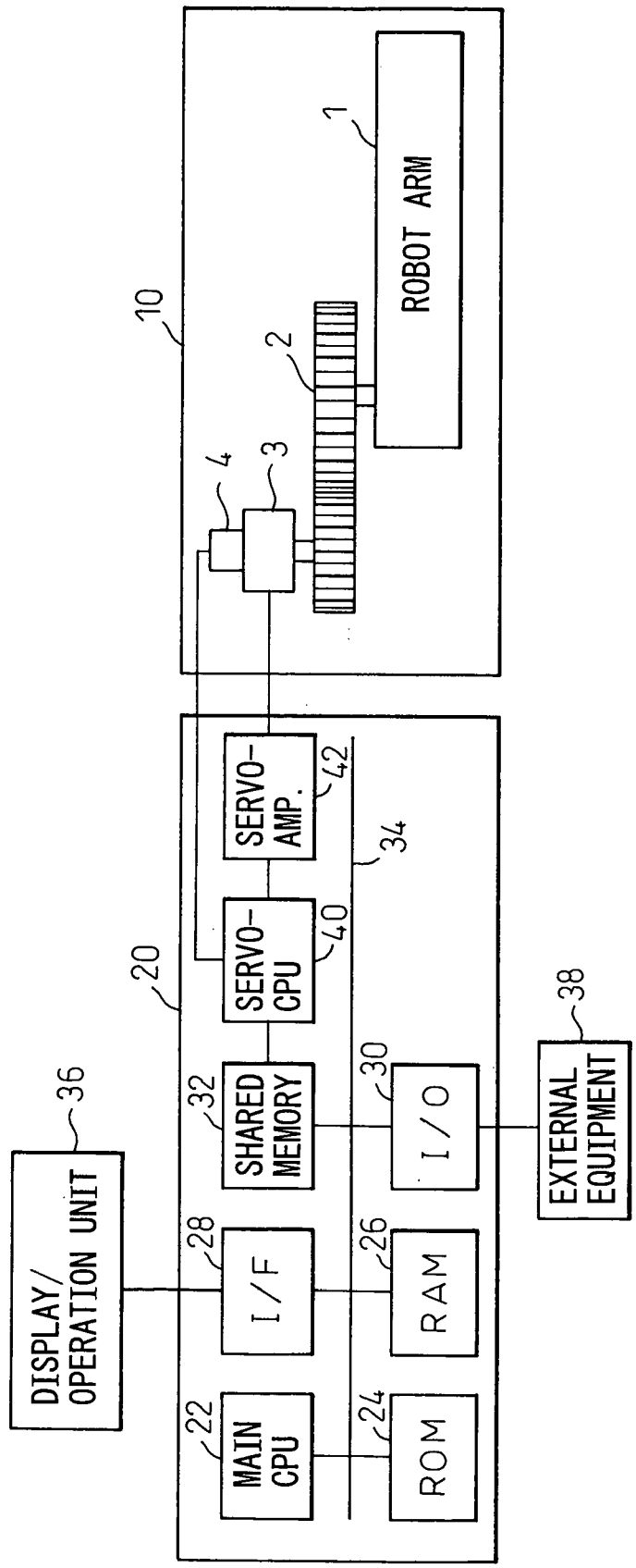
FIG. 2 is a block diagram showing the configuration of an arm control system for a robot, including a control device according to one embodiment of the present invention.
Figure 21:
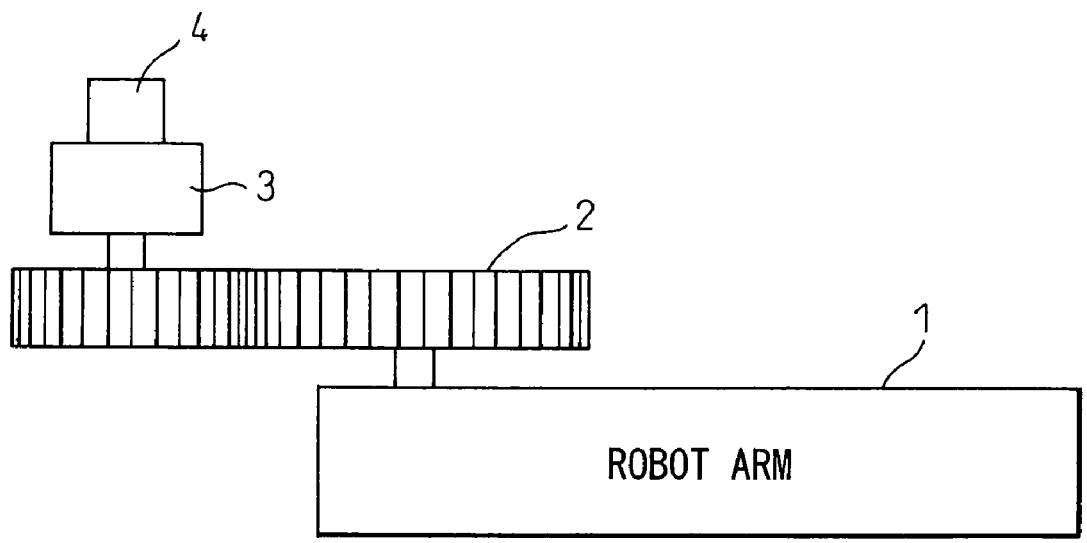
FIG. 21 is an illustration schematically showing the configuration of an actuator of a robot arm.

As shown in FIG. 2, the controlled system 10 in the robot is each of a plurality of control axes provided on the robot, and includes, e.g., the robot arm 1, the reduction mechanism 2, the motor 3 and the position/speed detector 4, previously described with reference to FIG. 21. Further, a robot control apparatus 20 including the control device according to one embodiment of the present invention has a configuration in which a main CPU 22 for controlling the entire system, a ROM 24, a RAM 26, an interface 28, an input/output circuit 30 and a shared memory 32 are interconnected through a bus 34. A display/operation unit 36, such as a teach pendant with touch-panel, is connected to the interface 28, and external equipment 38, such as a hand attached to the end of the robot arm 1, is connected to the input/output circuit 30. On the other hand, a servo-CPU 40 for controlling the position and speed of the motor 3 driving the robot arm 1 is connected to the shared memory 32. Further, a servo-amplifier 42 is connected to the servo-CPU 40, and the motor 3 in the controlled system 10 is connected to the servo-amplifier 42.

The main CPU 22 entirely controls the illustrated robot control system on the basis of a system program stored in the ROM 24, and outputs a motion command for each control axis of the robot through the shared memory 32 to the servo CPU 40 on the basis of a teaching program stored in the RAM 26. Based on the motion command and on position and speed feedback signals received from the position/speed detector 4 provided in the motor 3, the servo-CPU 40 performs a position and speed feedback control and issues a current command to the servo-amplifier 42. Then, the servo-amplifier 42 performs a state-feedback type control according to the present invention to make an electric current actually flowing to the motor 3 follow the current command.

Described below is a first example of control, performed by the servo-amplifier 42, wherein the state variable α (FIG. 1) of the controlled system 10 is the acceleration of the end portion of the robot arm 1.

A model for the controlled system 10 containing the robot arm 1 is the two-inertia model previously described with reference to FIG. 22. This controlled system 10 can be represented by the following state equation (1):

$$\begin{pmatrix} x_1' \\ x_2' \\ x_3' \end{pmatrix} = \begin{pmatrix} 0 & 0 & -\frac{J_L}{J_M} \\ 0 & 0 & 1 \\ \frac{K}{J_L} & -\frac{K}{J_M} & 0 \end{pmatrix} \cdot \begin{pmatrix} x_1 \\ x_2 \\ x_3 \end{pmatrix} + \begin{pmatrix} \frac{K_t}{J_M} \\ 0 \\ 0 \end{pmatrix} \cdot i \quad (1)$$

$$y = [1 \ 0 \ 0] \cdot \begin{pmatrix} x_1 \\ x_2 \\ x_3 \end{pmatrix}$$

In the state equation (1), $x_1$, $x_2$, $x_3$ are state variables, and $x_1'$, $x_2'$, $x_3'$ are the derivatives of the respective state variables. While referring to FIG. 22, $x_1=\omega_M$ (a motor speed), $x_2=\omega_L$ (an arm speed), $x_3=a_L$ (an arm acceleration). Further, "y" is the controlled variable of the controlled system 10 (FIG. 1); $y=x_1=\omega_M$. The corrected control input "v" in FIG. 1 is the motor current "i" (FIG. 22) in the state equation (1) (i.e., v=i).

The observer 12 can be represented by the following state equation (2):

$$\begin{pmatrix} x_1^{\sim'} \\ x_2^{\sim'} \\ x_3^{\sim'} \end{pmatrix} = \begin{pmatrix} -K_1 & 0 & -\frac{J_{Ln}}{J_{Mn}} \\ -K_2 & 0 & 1 \\ \frac{K_n}{J_{Ln}} - K_3 & -\frac{K_n}{J_{Mn}} & 0 \end{pmatrix} \cdot \begin{pmatrix} x_1^\sim \\ x_2^\sim \\ x_3^\sim \end{pmatrix} + \begin{pmatrix} \frac{K_m}{J_{Mn}} \\ 0 \\ 0 \end{pmatrix} \cdot i + \begin{pmatrix} K_1 \\ K_2 \\ K_3 \end{pmatrix} \cdot y \quad (2)$$

In the state equation (2), $x_1^\sim$, $x_2^\sim$, $x_3^\sim$ are the estimated values (i.e., the estimated state variables) of the state variables $x_1$, $x_2$, $x_3$; and $x_1^{\sim'}$, $x_2^{\sim'}$, $x_{3-'}$ are their derivatives. Further, $J_{Mn}$ is the nominal value of a motor inertia $J_M$, $J_{Ln}$ is the nominal value of an arm inertia $J_L$, $K_n$ is the nominal value of a spring constant K of a low-rigidity part, $K_{tn}$ is the nominal value of a motor torque constant $K_t$, and $K_1$, $K_2$, $K_3$ are observer parameters. In this connection, the observer theory is well known and, therefore, it will not be described in detail. Also, although it may be expected to further improve estimation accuracy if an external disturbance is added to a state variable, an observer considering no external disturbance is employed, for simplicity of explanation.

It is known that the estimated state variable $x^\sim$ settles to the actual state variable x when the observer parameters $K_1$, $K_2$ and $K_3$ are chosen so as to stabilize the observer system. Further, in the illustrated example, because the state variable of the controlled system 10 is the acceleration of the arm, the estimated value $x_3^\sim$ of the state variable $x_3$ representing the arm acceleration $a_L$ is used as the output of the observer 12 (FIG. 1).

In this connection, a brief description will be given of the model reference control employed in the present invention.

Figure 3:
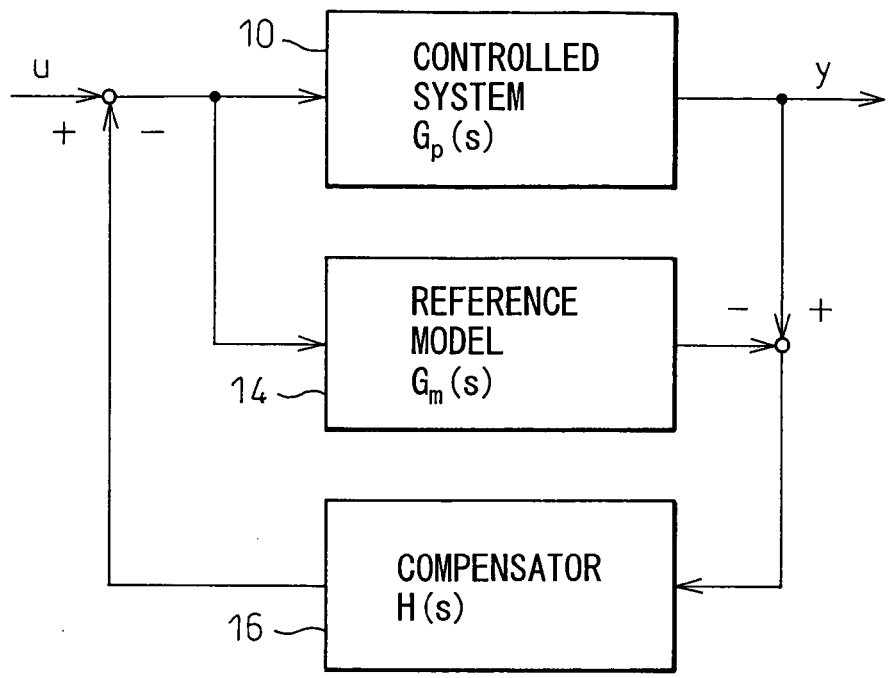
FIG. 3 is a block diagram showing one example of a model reference control.

In the block diagram of the model reference control shown in FIG. 3, a transfer function from a control input "u" to a controlled variable "y" is represented by the following equation (3):

$$\frac{y}{u} = \frac{G_p(s)}{1 + G_p(s) \cdot H(s) - G_m(s) \cdot H(s)} \quad (3)$$

In FIG. 3 and the equation (3), "u" is the control input, "y" is the controlled variable, $G_p(s)$ is the transfer function of the controlled system 10, $G_m(s)$ is the transfer function of the reference model 14 (FIG. 1), and H(s) is the transfer function of the compensator 16 (FIG. 1).

In the equation (3), if the transfer function H(s) of the compensator 16 is the inverse function of the transfer function $G_m(s)$ of the reference model 14, i.e., $H(s)=1/G_m(s)$, the transfer function from the control input "u" to the controlled variable "y" is given by the following equation (4), which is equal to the transfer function $G_m(S)$ of the reference model 14:

$$\frac{y}{u} = \frac{G_p(s)}{1+\frac{G_p(s)}{G_m(s)}-\frac{G_m(s)}{G_m(s)}} = G_m(s) \quad (4)$$

Figure 4:
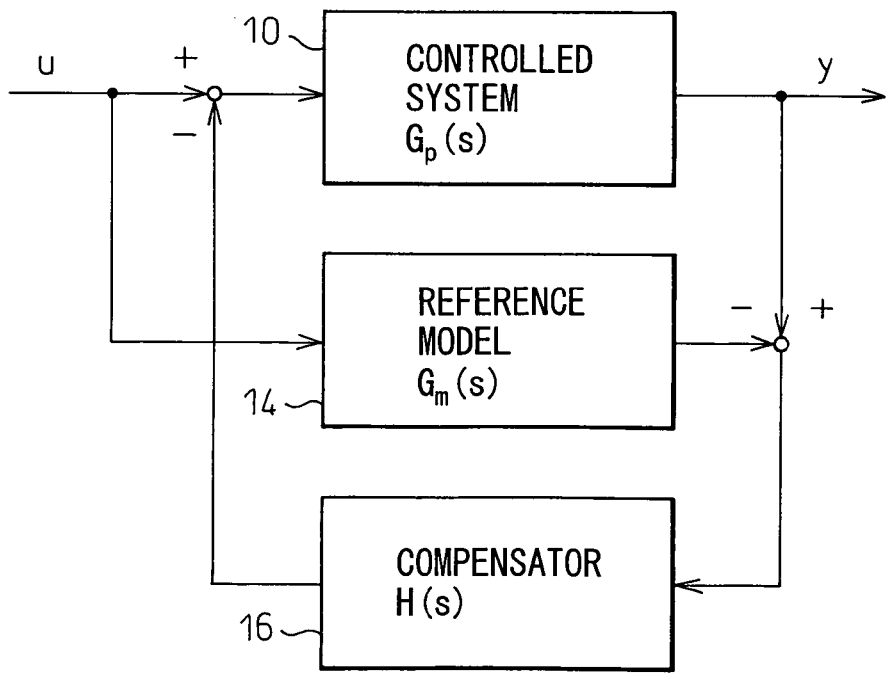
FIG. 4 is a block diagram showing another example of a model reference control.

Also, in the block diagram of the model reference control shown in FIG. 4, a transfer function from a control input "u" to a controlled variable "y" is represented by the following equation (5):

$$\frac{y}{u} = G_p(s) \cdot \frac{1+G_m(s) \cdot H(s)}{1+G_p(s) \cdot H(s)} \quad (5)$$

In this connection, if a sufficiently large gain function is adopted as the transfer function H(s) of the compensator 16, "y/u" becomes approximately equal to the transfer function $G_m(s)$ of the reference model 14, as shown by the equation (6):

$$\frac{y}{u} \approx G_p(s) \cdot \frac{G_m(s) \cdot H(s)}{G_p(s) \cdot H(s)} = G_m(s) \quad (6)$$

Accordingly, the object of the present invention can be accomplished whichever model reference control shown in FIG. 3 or 4 is employed. The control example described herein assumes the use of the model reference control shown in FIG. 3.

Figure 22:
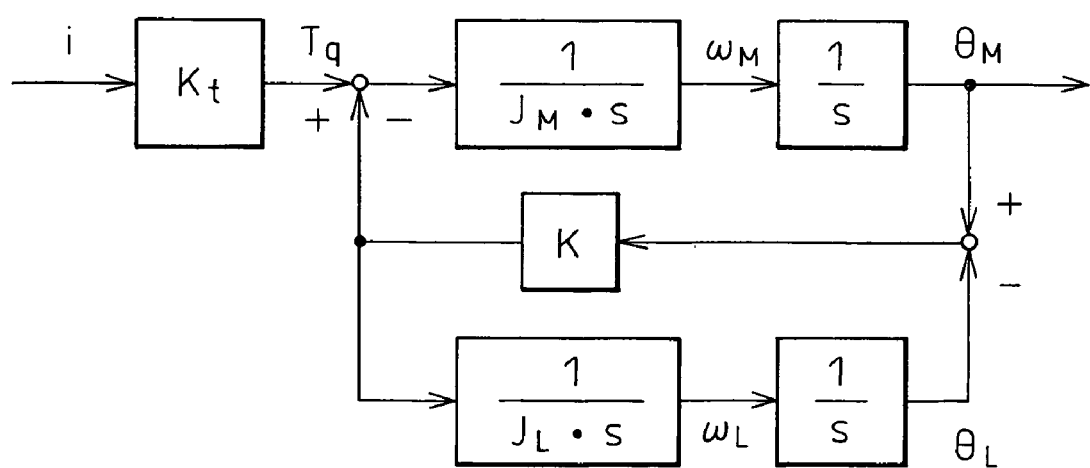
FIG. 22 is a block diagram showing the configuration from a motor current (or an input) to position and speed (or an output) in a robot-arm driving system.

In the two-inertia model of the robot-arm control shown in FIG. 22, a transfer function from a current command "i" (corresponding to a control input "u") to an arm-end acceleration $a_L$ is represented by the following equation (7):

$$\frac{a_L}{i} = \frac{Kt \cdot K}{J_L \cdot J_M s^2 + (J_L+J_m) \cdot K} = \frac{K_t}{J_L+J_m} \cdot \frac{1}{\frac{J_L \cdot J_M}{(J_L+J_m) \cdot K} \cdot s^2+1} \quad (7)$$

Figure 5:
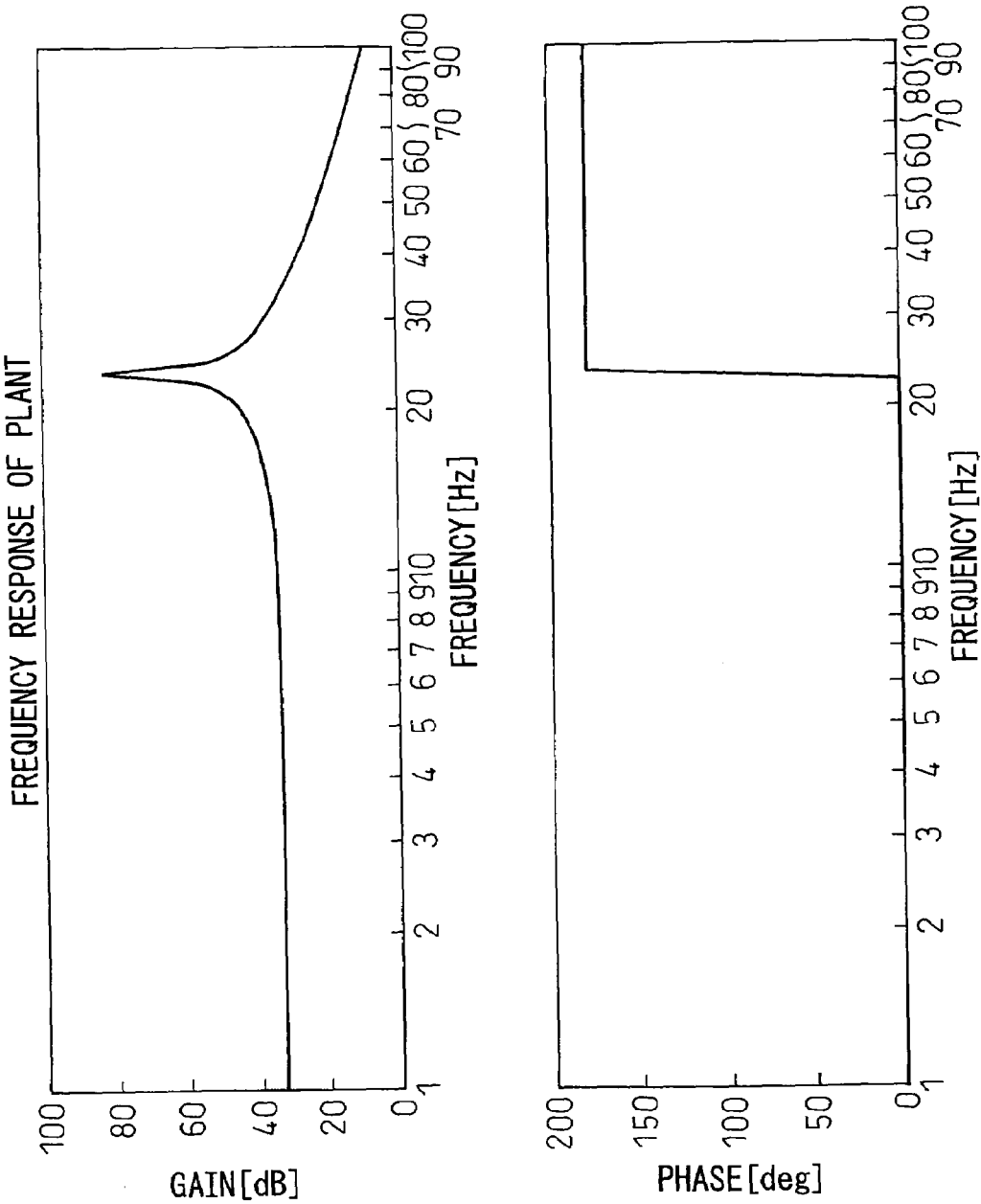
FIG. 5 is a Bode diagram of a transfer function from a current command to an arm-end acceleration in a two-inertia model.

In this connection, provided that the motor torque constant $K_t$=5 [kgf·cm/A], the motor inertia $J_M$=0.01 [kgf·cm/s²], the arm inertia $J_L$=0.1 [kgf·cm/s²], and the spring constant K=200 [kgf/rad], the Bode diagram of the transfer function represented by equation (7) is obtained as shown in FIG. 5.

As shown in the Bode diagram of FIG. 5, the response of the transfer function (7) is not stable. Therefore, the reference model 14 having a standard second-order transfer function is employed to stabilize the response. The transfer function $G_m(s)$ of the reference model 14 is represented by the following equation (8):

$$G_m(s) = \frac{K_{tm}}{J_m} \cdot \frac{1}{\frac{1}{\omega_n^2} \cdot s^2 + 2 \cdot \frac{\zeta}{\omega_n} \cdot s + 1} \quad (8)$$

In the equation (8), $J_m$ is a reference-model inertia, $K_{tm}$ is a reference-model torque constant, $\omega_n$ is a resonant angular frequency of a model, and $\zeta$ is a damping constant.

The transfer function of the compensator 16, exhibiting an inverse characteristic reverse to a characteristic of the reference model 14; in other words, the inverse transfer function $G_m(S)^{-1}$ of the transfer function $G_m(s)$ of the reference model 14, is represented by the following equation (9):

$$G_m(s)^{-1} = \frac{J_m}{K_{tm}} \cdot \left(\frac{1}{\omega_n^2} \cdot s^2 + 2 \cdot \frac{\zeta}{\omega_n} \cdot s + 1\right) \quad (9)$$

However, the inverse transfer function $G_m(S)^{-1}$ shown by the above equation (9) is an improper function, whose characteristic significantly leans toward a derivative element, and is therefore difficult to handle. In view of this, the transfer function H(s) of the compensator 16 represented by the following equation (10) is adopted:

$$H(s) = G_m(s)^{-1} \cdot F(s) = \frac{J_{tm}}{K_{tm}} \cdot \frac{\frac{1}{\omega_n^2} \cdot s^2 + 2 \cdot \frac{\zeta}{\omega_n} \cdot s + 1}{\frac{1}{\omega_f^2} \cdot s^2 + 2 \cdot \frac{\zeta_f}{\omega_f} \cdot s + 1} \quad (10)$$

In the equation (10), F(s) is a transfer function of a filter, which is represented by the following equation (11), in which $\omega_f$ and $\zeta_f$ are filter parameters:

$$F(s) = \frac{\omega_f^2}{s^2 + 2 \cdot \zeta_f \cdot \omega_f \cdot s + \omega_f^2} \quad (11)$$

Figure 6:
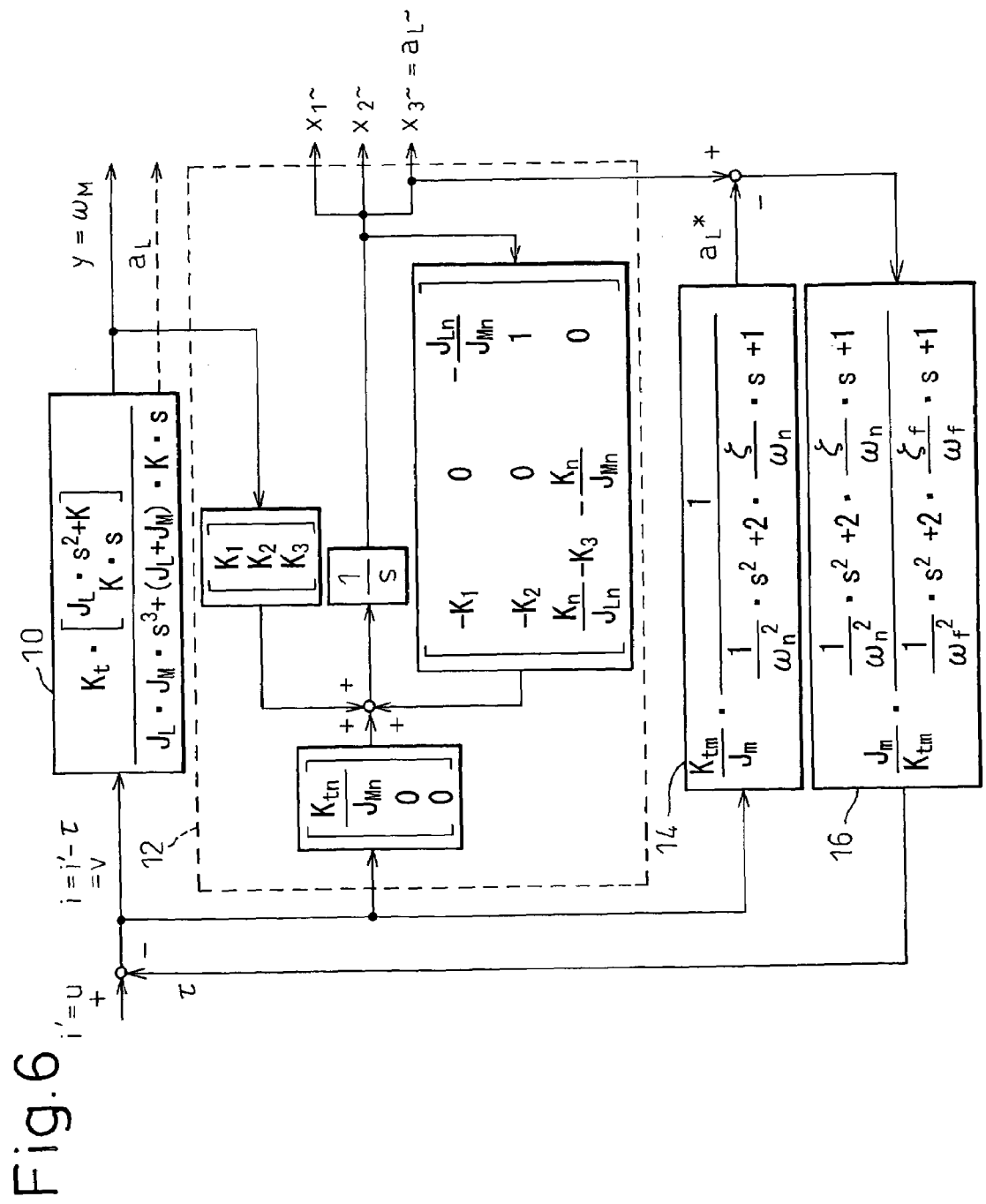
FIG. 6 is a block diagram showing the configuration of a first control example performed by the control device of FIG. 2, in which an observer is incorporated in the model reference control of FIG. 3.

FIG. 6 shows a block diagram of the control device incorporating therein the observer 12 represented by the state equation (2) as already described, provided that the equation (8) is adopted as the transfer function $G_m(s)$ of the reference model 14 and the equation (10) is adopted as the transfer function $G_m(S)^{-1}$ of the compensator 16.

Figure 7:
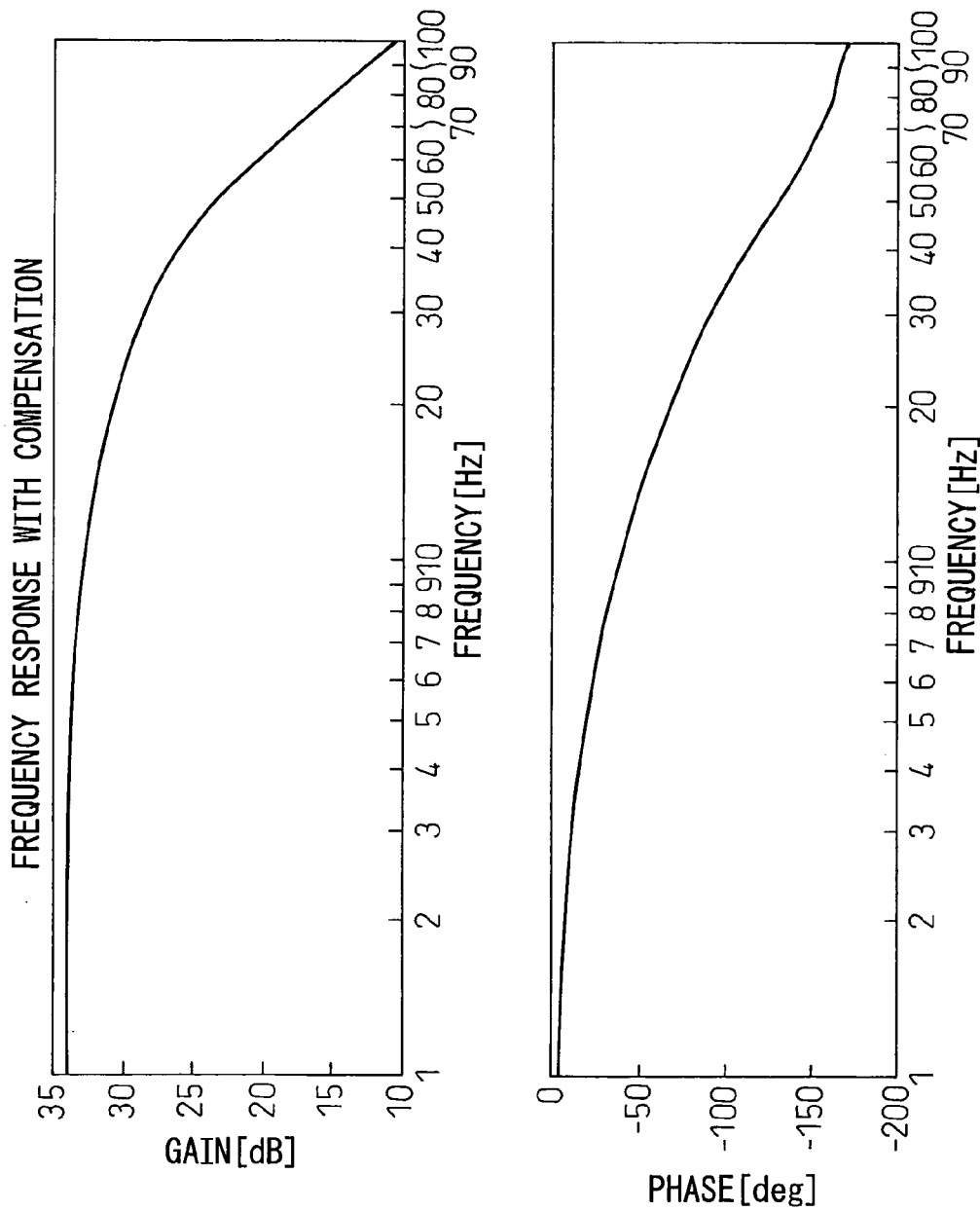
FIG. 7 is a Bode diagram of a transfer function from a current command to an arm-end acceleration in the block diagram of FIG. 6.

In this connection, provided that the observer parameters $K_1$, $K_2$, $K_3$ are selected so that an observer pole placement becomes a 120 Hz Butterworth-pattern pole placement by using the nominal values of the controlled system 10; that, as for the reference model 14, the reference torque constant $K_{tm}$=5, the reference model inertia $J_m$=0.1, the resonant angular frequency $\omega_n$ of the model=2·π·20, and the damping constant $\zeta$=0.7; and that, as for the compensator 16, the filter parameter of $\omega_f$=2·π·100 [Hz] and the filter parameter of $\zeta_f$=1; the Bode diagram of the transfer function from the current command "i" as the control input "u" (i'=u) to the arm acceleration "$a_L$" as the controlled variable, in the block diagram of FIG. 6, is obtained as shown in FIG. 7. Note that, as shown in FIG. 6, the compensation value determined by the compensator 16 is a compensation current (or a compensation torque) τ, and a revised current command "i"

obtained by subtracting the compensation current τ from the current command "i'" is used as the corrected control input "v" (i=v).

As is apparent from FIG. 7, the controlled system 10 is significantly stabilized.

Figure 8:
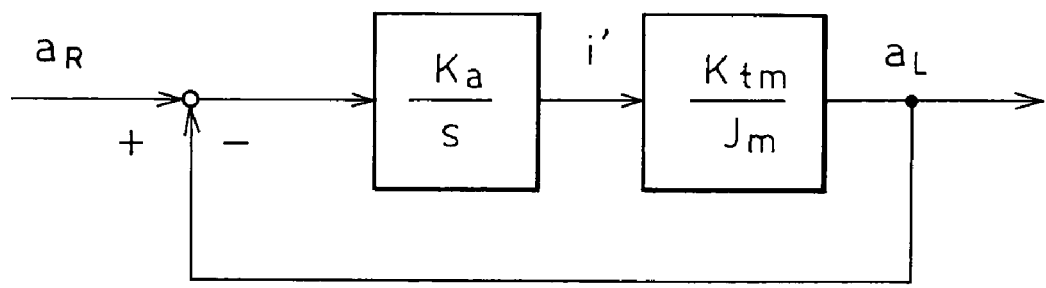
FIG. 8 is a block diagram illustrating, by way of a type 1 model, a servo loop from an acceleration command to an arm-end acceleration in the first control example.

Then, by taking a transfer function from the current command i' (=u) to the arm acceleration $a_L$ (the controlled variable) as a new controlled system 10, a servo-loop for ensuring the response of the arm-end acceleration to the acceleration command is constructed. For simplicity of explanation, a type 1 servo-system shown in FIG. 8 is employed. The transfer function of this servo system is represented by the following equation (12); in FIG. 8 and the equation (12), $\alpha_R$ is an acceleration command and $K_a$ is an acceleration loop gain:

$$\frac{a_L}{a_R} = \frac{K_a \cdot K_{tm}}{J_m \cdot s + K_a \cdot K_{tm}} = \frac{1}{\frac{J_m}{K_a \cdot K_{tm}} \cdot s + 1} \quad (12)$$

In the equation (12), provided that $K_a = J_m/(T \cdot K_{tm})$, the transfer function is given as the following equation (13):

$$\frac{a_L}{a_R} = \frac{1}{T \cdot s + 1} \quad (13)$$

Thus, the transfer function is the first-order response of a time constant T(s) and, as a result, an acceleration control loop having excellent response and free from steady-state errors, which generates no vibration, can be achieved.

Figure 9:
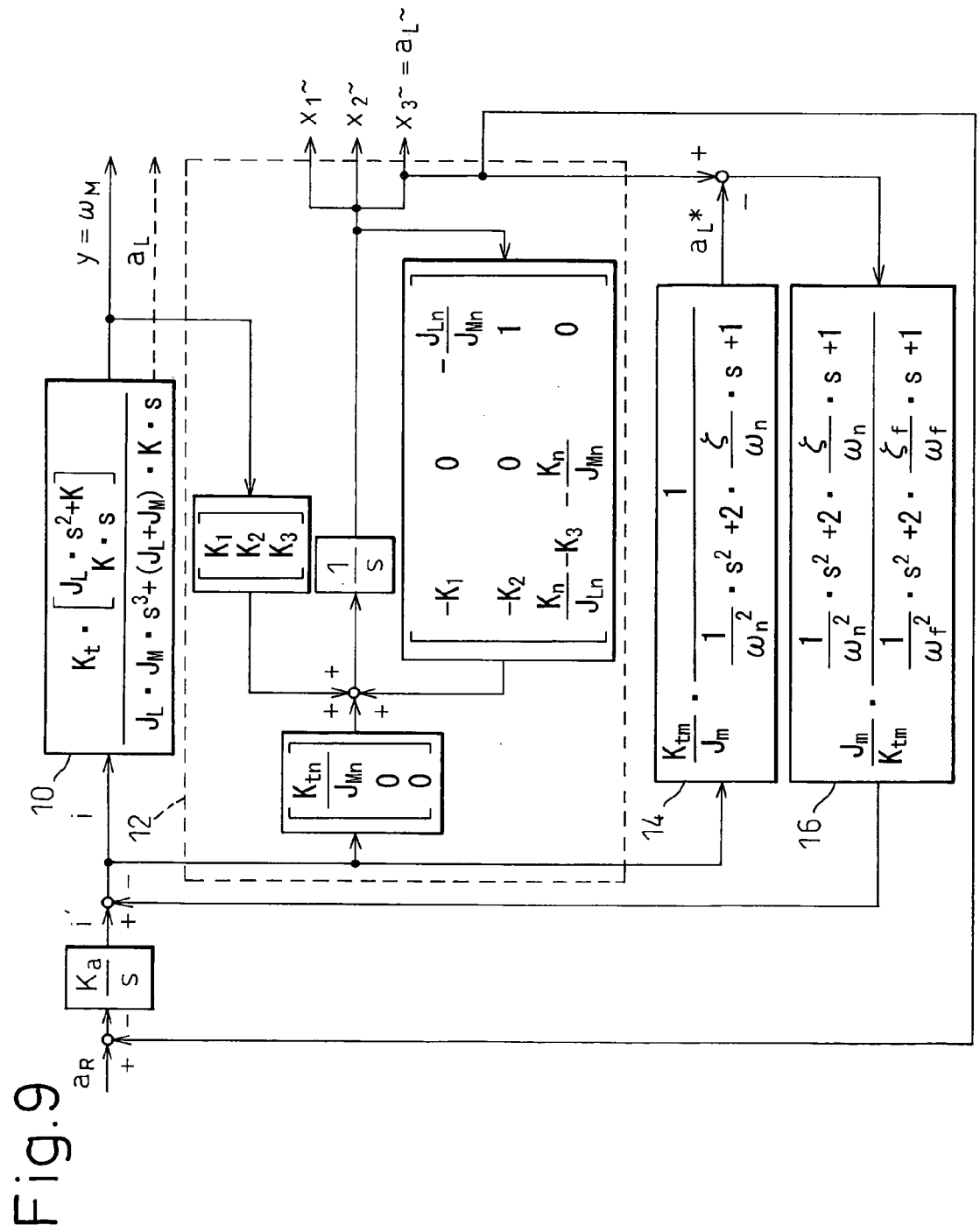
FIG. 9 is a block diagram showing a configuration in which an acceleration control loop is added to the block diagram of FIG. 6.

A system including the above acceleration control loop, provided outside the model reference control loop of FIG. 6, is shown in FIG. 9 as a block diagram.

Figure 10:
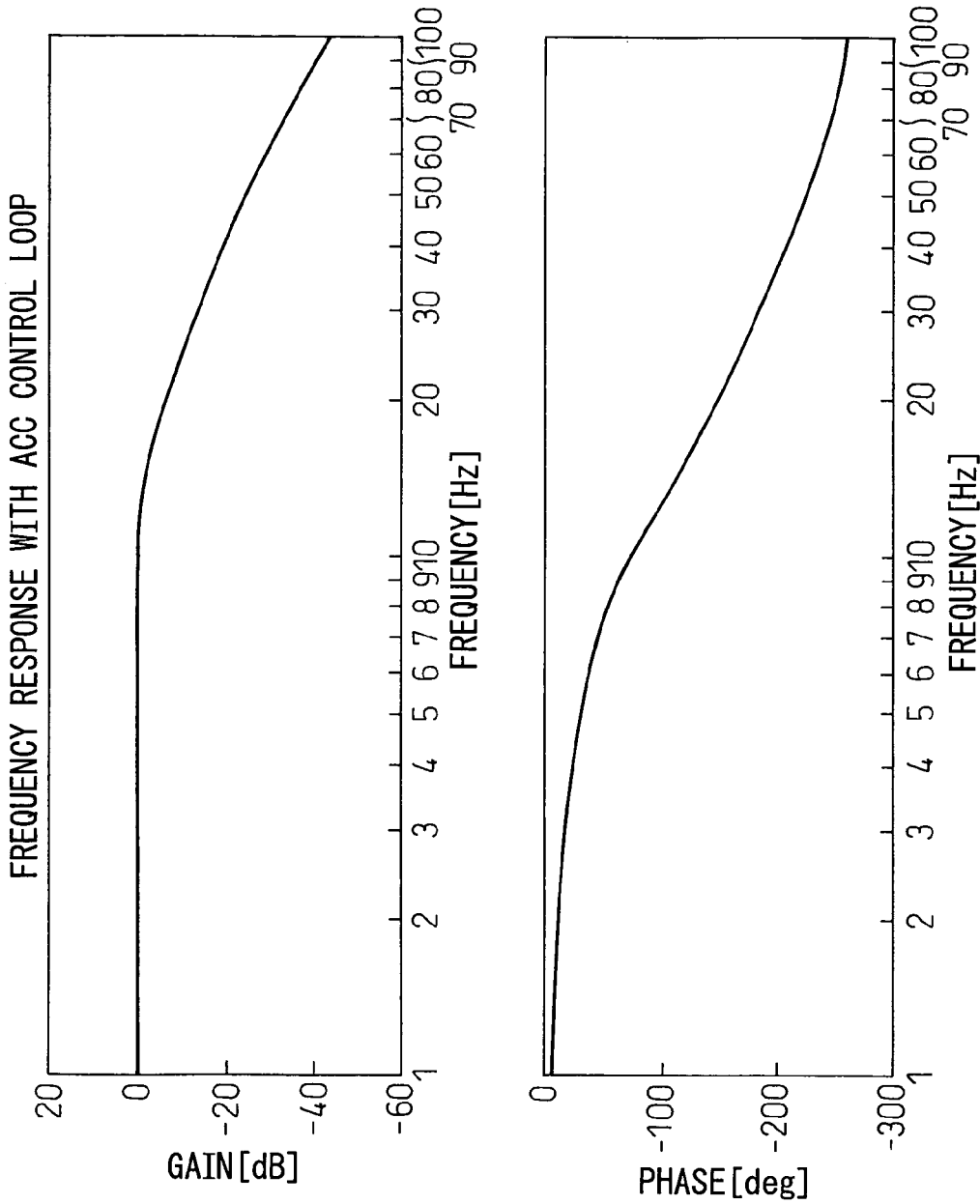
FIG. 10 is a Bode diagram of a transfer function from an acceleration command to an arm-end acceleration in the block diagram of FIG. 9.

FIG. 10 shows the Bode diagram of the transfer function from the acceleration command $a_R$ to the arm acceleration $a_L$ in the block diagram of FIG. 9 incorporating therein the acceleration control loop. In this case, the acceleration loop gain $K_a$ is chosen to be $K_a = J_m/K_{tm}(1/2/\pi/10)$.

As shown in FIG. 10, an extremely stable control response is achieved. In this connection, if only the observer 12 is matched to the characteristics of the controlled system 10, it is possible to use, in a versatile manner, the reference model 14, the compensator 16 and the acceleration loop gain, irrespective of the characteristics of the controlled system 10.

Figure 11:
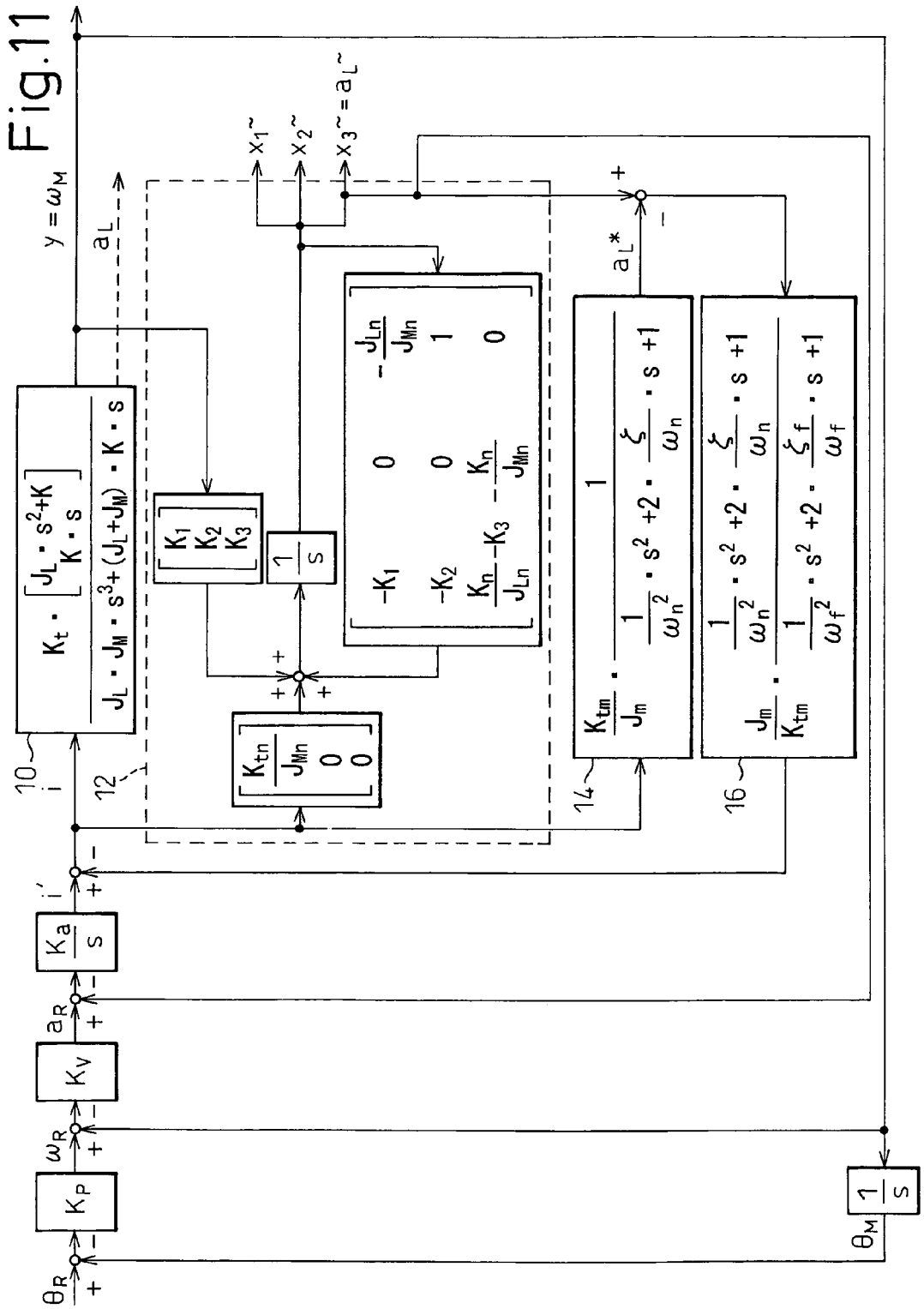
FIG. 11 is a block diagram showing the entire configuration of the first control example in which position and speed control loops are added to the block diagram of FIG. 9.
Figure 12:
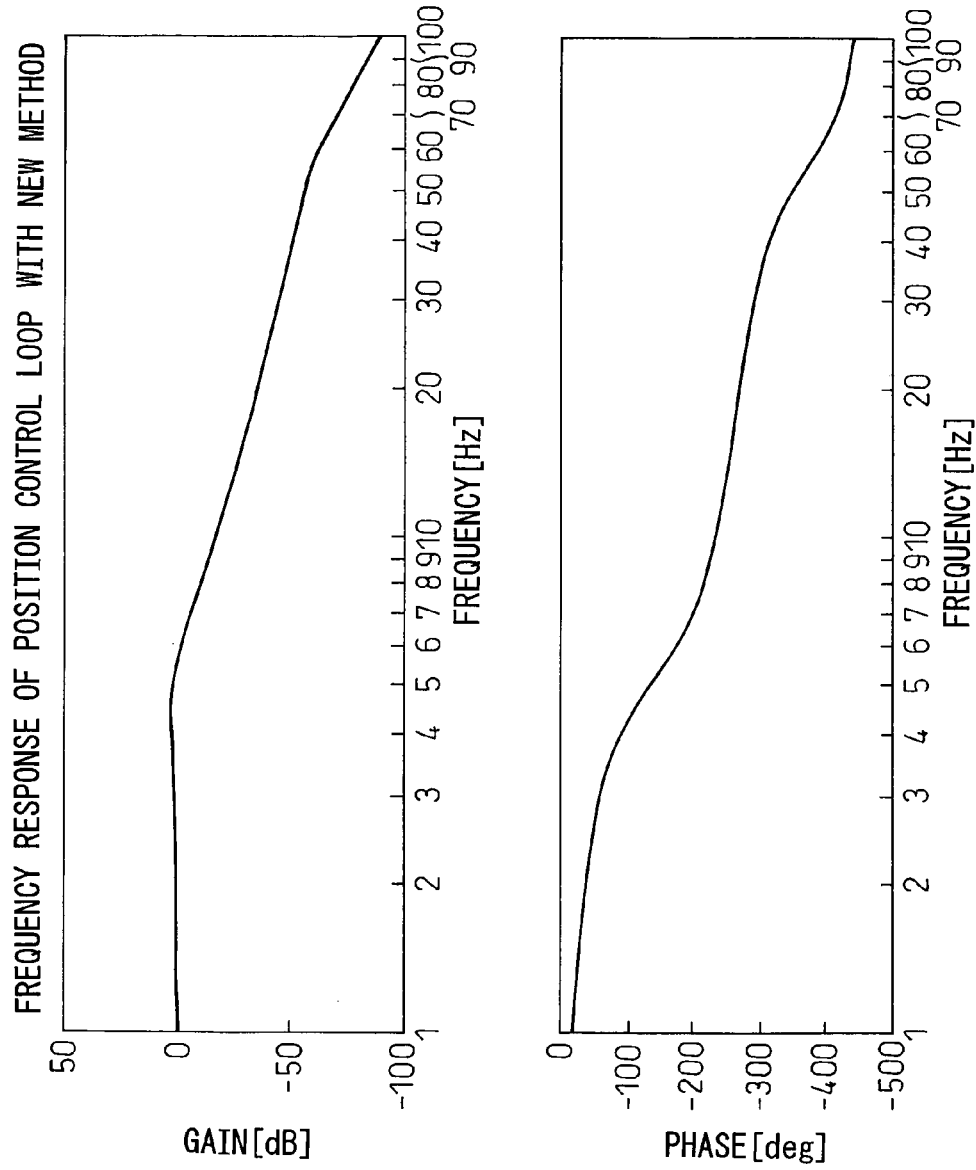
FIG. 12 is a Bode diagram of a transfer function from a position command to an arm-end position in the block diagram of FIG. 11.
Figure 13:
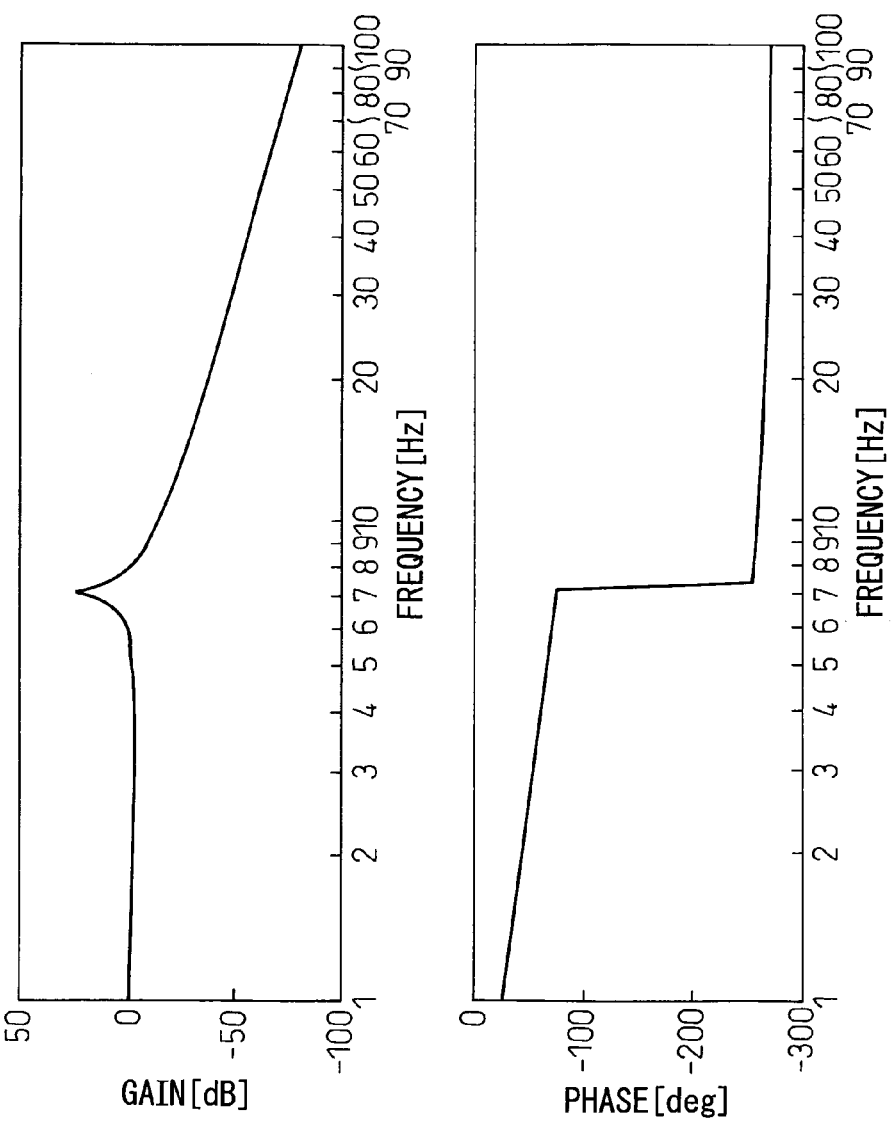
FIG. 13 is a Bode diagram of a transfer function from a position command to an arm-end position in a conventional semi-closed loop control.

FIG. 11 shows, as a block diagram, the entire configuration of the first example of the robot-arm control wherein position and speed loops are added to the block diagram of FIG. 9. FIG. 12 shows the Bode diagram of the transfer function from the position command $\theta_R$ to the arm-end position $\theta_L$ obtained by twice integrating the arm acceleration $a_L$, in the block diagram of FIG. 11. For comparison purposes, FIG. 13 shows the Bode diagram of the transfer function from the position command $\theta_R$ to the arm-end position $\theta_L$ in the semi-closed loop control of FIG. 23. In FIGS. 12 and 13, a position loop bandwidth is 2 Hz and a speed loop bandwidth is 5 Hz (because the resonant frequency of the machine is 7 Hz).

As can be understood from a comparison between FIGS. 12 and 13, stable control can be achieved according to the present invention.

Figure 14A:
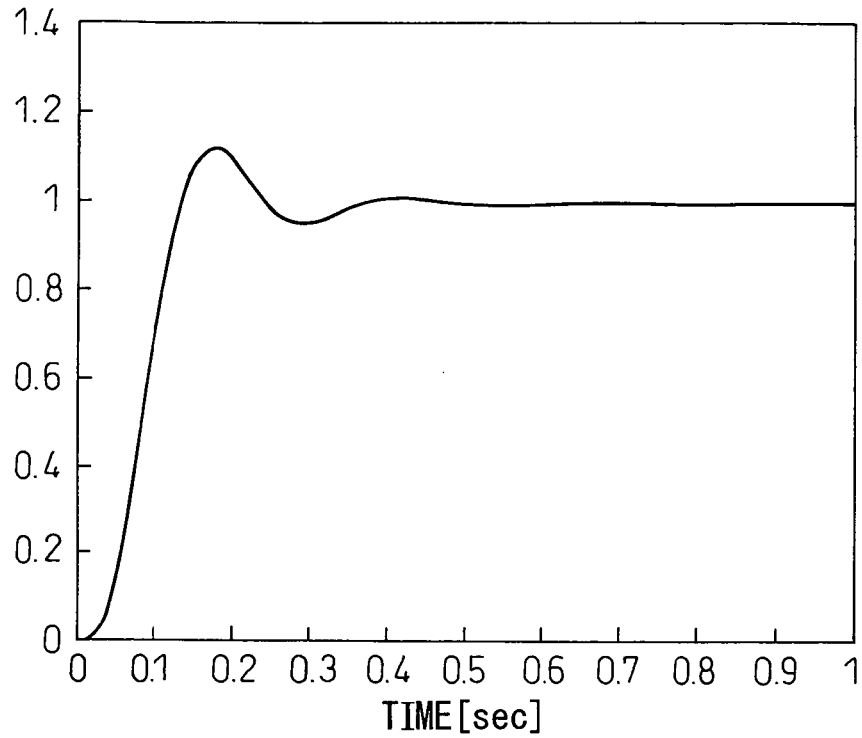
FIG. 14A is a diagram showing the response of the arm-end position to a step input of a position command, in the control system shown in FIG. 11.
Figure 14B:
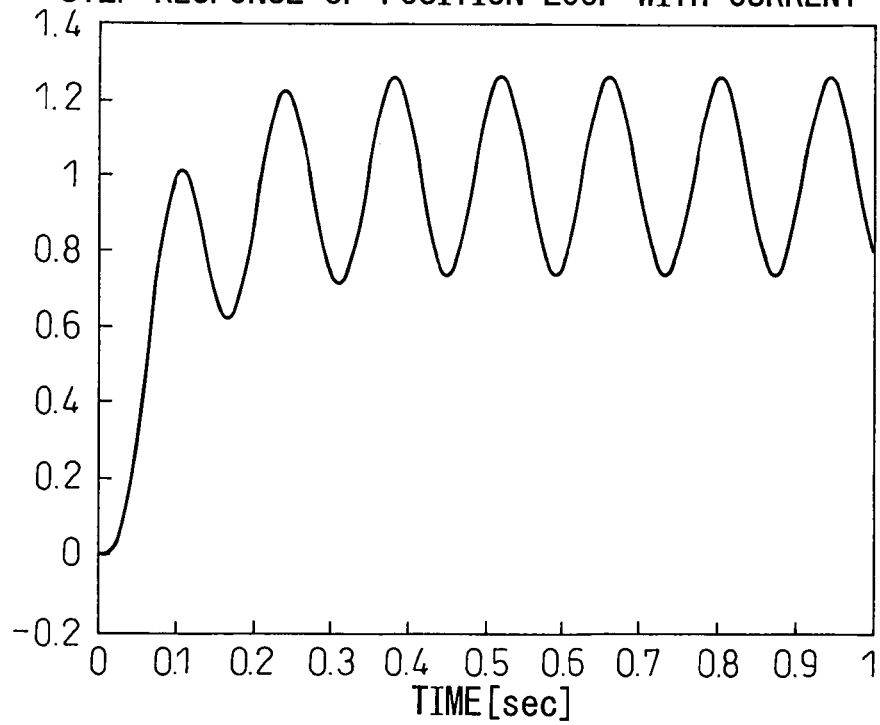
FIG. 14B is a diagram showing the response of the arm-end position to a step input of a position command, in the conventional semi-closed loop control.
Figure 23:
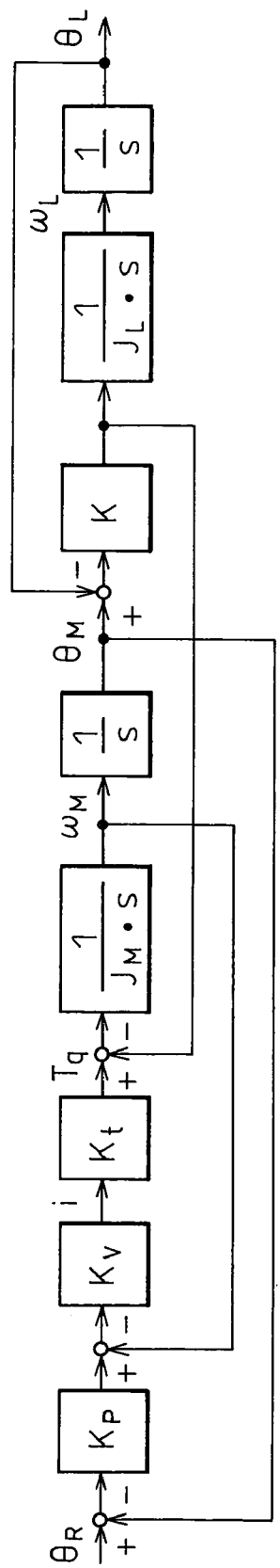
FIG. 23 is a block diagram showing a robot-arm position and speed control according to a conventional semi-closed loop control.
Figure 24:
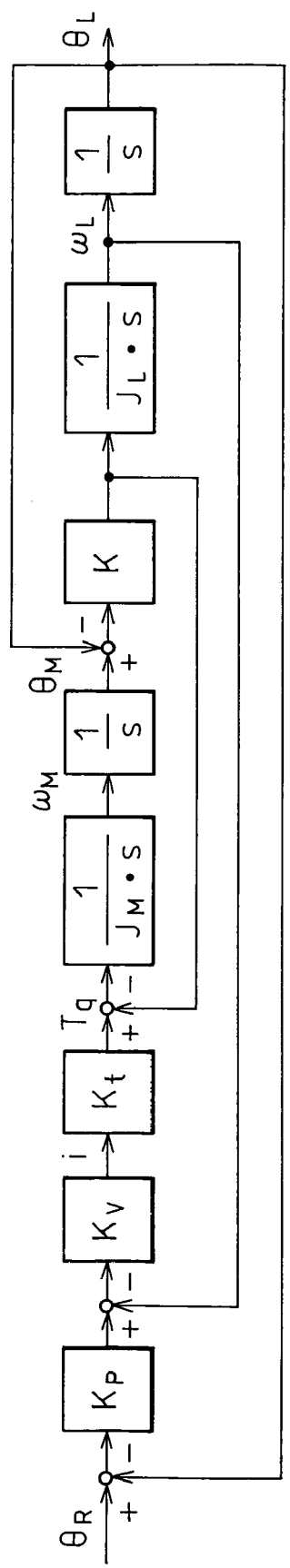
FIG. 24 is a block diagram showing a robot-arm position and speed control according to a conventional full-closed loop control.
Figure 25:
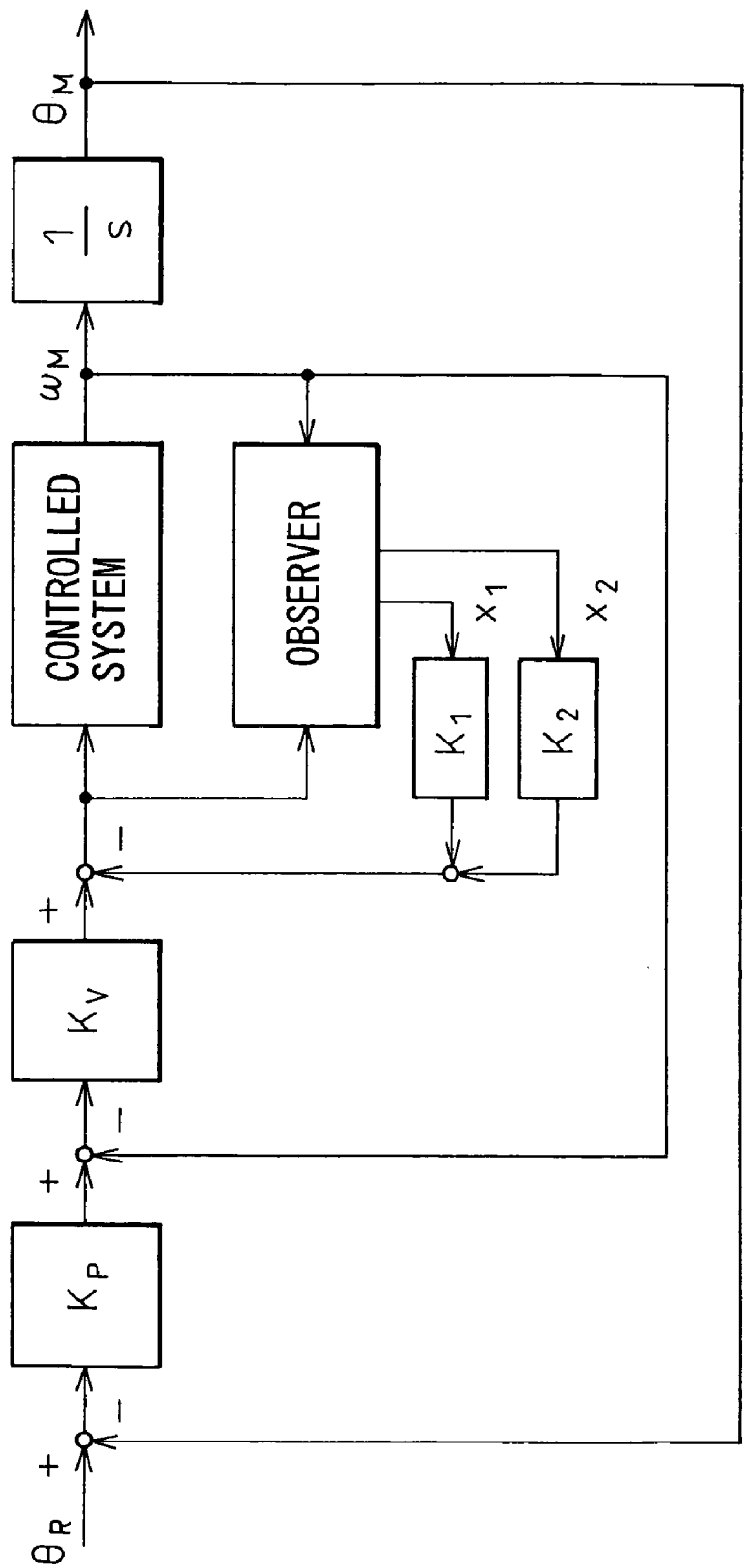
FIG. 25 is a block diagram showing a conventional control system using a state-feedback type control method.

In this respect, the response of the arm-end position $\theta_L$, in a case where a step-input is applied by the position command $\theta_R$, is shown in FIG. 14A. On the other hand, the response to a step-input in the semi-closed loop control of FIG. 23 is shown in FIG. 14B. As can be understood from a comparison between FIGS. 14A and 14B, vibrations occur in the conventional semi-closed loop control, but in the present invention, no vibration occurs and a stable control is accomplished.

Described below is a second example of control, performed by the servo-amplifier 42 (FIG. 2), wherein the state variable α (FIG. 1) of the controlled system 10 is the speed of the end portion of the robot arm 1 (FIG. 2). For the controlled system 10 containing the robot arm 1, a transfer function from a current command "i" to an arm-end speed $\theta_L$ is represented by the following equation (14):

$$\frac{\omega_L}{i} = \frac{K_t}{(J_L + J_M) \cdot s} \cdot \frac{1}{\frac{J_L \cdot J_M}{(J_L + J_M) \cdot K} \cdot s^2 + 1} \quad (14)$$

Accordingly, the transfer function $G_m(s)$ of the reference model 14 is represented by the following equation (15):

$$G_m(s) = \frac{K_{tm}}{J_m \cdot s} \cdot \frac{1}{\frac{1}{\omega_n^2} \cdot s^2 + 2 \cdot \frac{\zeta}{\omega_n} \cdot s + 1} \quad (15)$$

The relative order of the transfer function $G_m(s)$ of the above reference model 14 is three, so that the transfer function H(s) of the compensator 16 represented by the following equation (16) is adopted:

$$H(s) = G_m(s)^{-1} \cdot F(s) = \frac{J_m \cdot s}{K_{tm}} \cdot \frac{\frac{1}{\omega_n^2} \cdot s^2 + 2 \cdot \frac{\zeta}{\omega_n} \cdot s + 1}{a_3 \cdot s^3 + \cdot a_2 \cdot s^2 + \cdot a_1 \cdot s + 1} \quad (16)$$

The filter parameters "$a_1$" to "$a_3$" in the equation (16) are selected so as to stabilize the system. The observer 12 (FIG. 1) used here is the same as that used in the first example, and the estimated state variable $x_2\tilde{}$ corresponding to the estimated arm speed $\omega_L\tilde{}$ is used as an observer output to be compared with the output of the reference model 14.

In this connection, if the natural angular frequency $\omega_n$ of the reference model 14 is sufficiently higher than the response frequency of a speed control loop, a transfer function represented by the following equation (17) can be used as the controlled system 10 when designing the speed loop:

$$G(s) = \frac{K_{tm}}{J_m \cdot s} \quad (17)$$

Figure 15:
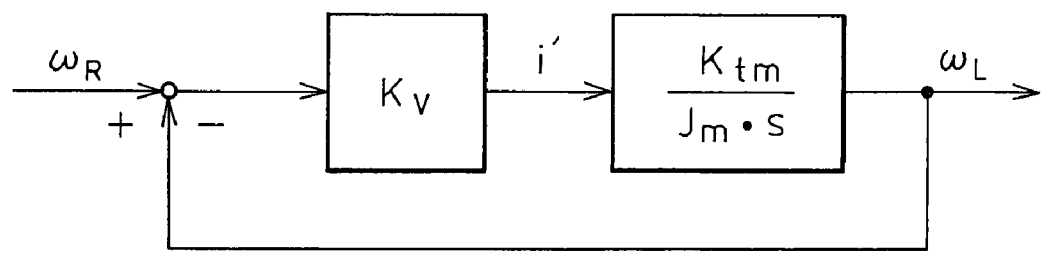
FIG. 15 is a block diagram showing a simplified model of a servo loop from a speed command to an arm-end speed, in a second control example performed by the control device of FIG. 2.

Provided that the controlled system 10 is the above transfer function G(s), a speed control gain is determined using a simplified model shown by the block diagram of FIG. 15. In this connection, $\omega_R$ is a speed command, and $K_v$ is a speed loop gain.

The transfer function of the simplified model of FIG. 15 is represented by the following equation (18):

$$\frac{\omega_L}{\omega_R} = \frac{K_v \cdot K_{tm}}{J_m \cdot s + K_v \cdot K_{tm}} = \frac{1}{\frac{J_m}{K_v \cdot K_{tm}} \cdot s + 1} \qquad (18)$$

In the equation (18), if the speed loop gain $K_v = J_m/(K_{tm} \cdot T)$, the transfer function of the equation (18) is rewritten as the following equation (19), which leads to a stable response with no vibration in a time constant T(s):

$$\frac{\omega_L}{\omega_R} = \frac{1}{T \cdot s + 1} \qquad (19)$$

Figure 16:
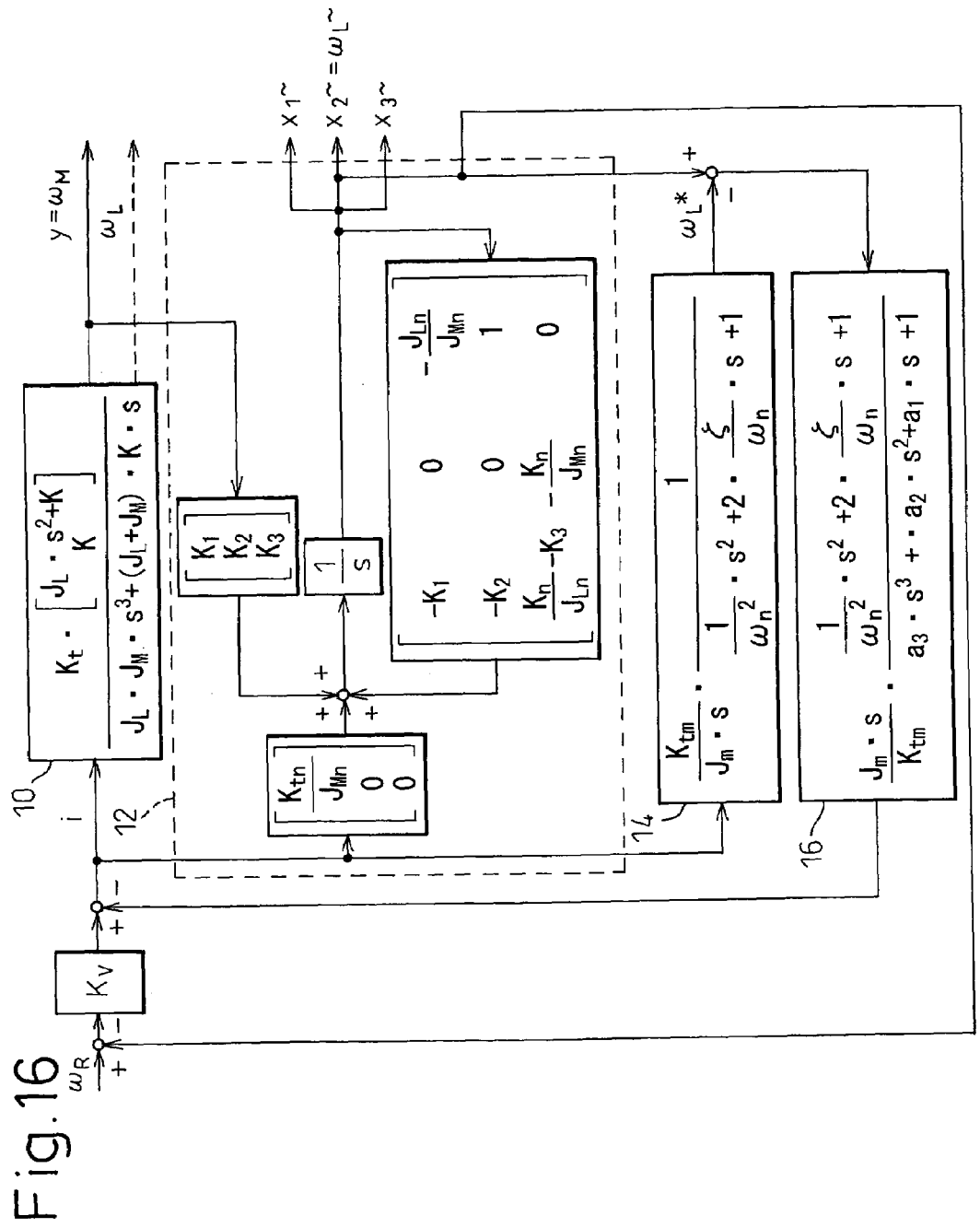
FIG. 16 is a block diagram showing a configuration from a speed command to an arm-end speed in the second control example.
Figure 17:
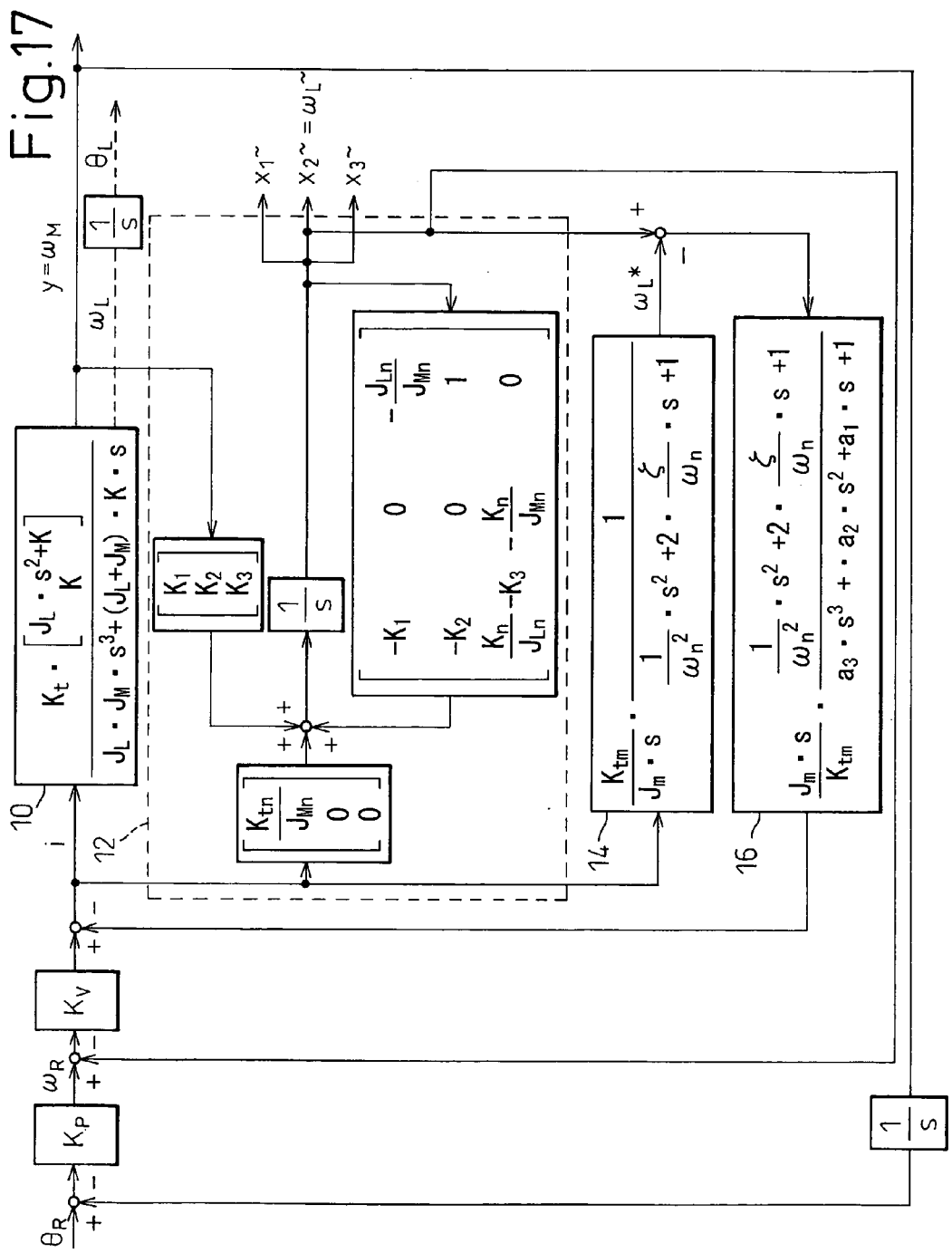
FIG. 17 is a block diagram showing the entire configuration of the second control example in which a position control loop is added to the block diagram of FIG. 16.

FIG. 16 shows a block diagram from the speed command $\omega_R$ to the arm-end speed $\omega_L$ in the case where the state variable of the controlled system 10 is the arm-end speed $\omega_L$. FIG. 17 shows a configuration in which a position loop is incorporated into the block diagram of FIG. 16.

Figure 18:
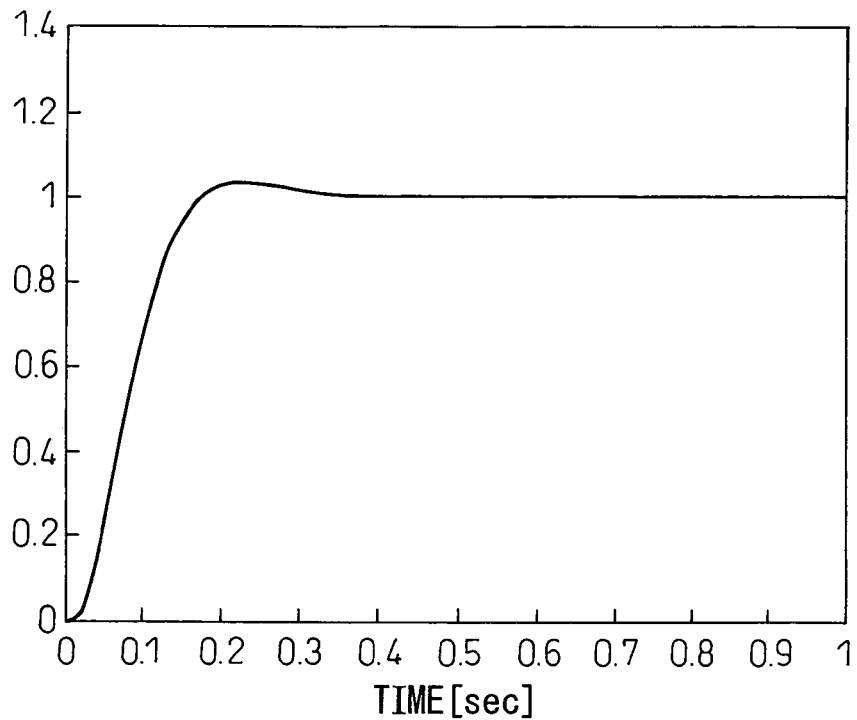
FIG. 18 is a diagram showing the response of the arm-end speed to a step input of a position command, in the control system shown in FIG. 17.

FIG. 18 shows the response of the arm-end speed, in a case where a step-input is applied by the position command $\theta_R$ in the control system of FIG. 17 incorporating therein the position loop. As can be seen from the figure, a stable control system free from vibrations can be obtained.

In the above second example, the same values as used in the first example have been used for the controlled system 10, the observer 12, and the standard second-order parameters $K_{tm}$ and $J_m$ in the reference model 14. Further, the filter parameters $a_1$ to $a_3$ have been selected so as to satisfy the condition shown by the following equation (20), in which $\delta = 1/\omega_f$ and $\omega_f = 2 \cdot \pi \cdot 100$ [Hz]. Further, the speed control gain $K_v = J_m/K_{tm}/(1/2/\pi/5$ [Hz]) and the position control gain $K_p = 2 \cdot \pi \cdot 2$ [Hz].

$$a_3 \cdot s^3 + a_2 \cdot s^2 + a_1 \cdot s + 1 = 0.15 \delta^3 \cdot s^3 + 0.5 \delta^2 \cdot s^2 + \delta \cdot s + 1 \qquad (20)$$

Described below is a third example of control, performed by the servo amplifier 42 (FIG. 2), wherein the state variable α (FIG. 1) of the controlled system 10 is the position of the end portion of the robot arm 1 (FIG. 2).

In this connection, if the arm-end acceleration is included in the state variable, the controlled system 10 is represented by the following state equation (21), in which a state variable $x_1$ is a motor speed $\omega_M$, $x_2$ is a motor position $\theta_M$, $x_3$ is an arm speed $\omega_L$, and $x_4$ is an arm position $\theta_L$. Further, to enhance the observability, the motor position $x_2$ ($=\theta_M$) is taken as the controlled variable "y".

$$\begin{pmatrix} x_1' \\ x_2' \\ x_3' \\ x_4' \end{pmatrix} = \begin{pmatrix} 0 & -\frac{K}{J_m} & 0 & \frac{K}{J_m} \\ 1 & 0 & 0 & 0 \\ 0 & \frac{K}{J_L} & 0 & -\frac{K}{J_L} \\ 0 & 0 & 1 & 0 \end{pmatrix} \cdot \begin{pmatrix} x_1 \\ x_2 \\ x_3 \\ x_4 \end{pmatrix} + \begin{pmatrix} \frac{K_t}{J_m} \\ 0 \\ 0 \\ 0 \end{pmatrix} \cdot i \qquad (21)$$

$$y = [0 \ 1 \ 0 \ 0] \cdot \begin{pmatrix} x_1 \\ x_2 \\ x_3 \\ x_4 \end{pmatrix}$$

The observer 12 (FIG. 1) is represented by the following state equation (22):

$$\begin{pmatrix} \tilde{x}_1' \\ \tilde{x}_2' \\ \tilde{x}_3' \\ \tilde{x}_4' \end{pmatrix} = \begin{pmatrix} -K_1 & -\frac{K_n}{J_{Mn}} & 0 & \frac{K_n}{J_{Mn}} \\ 1-K_2 & 0 & 0 & 0 \\ -K_3 & \frac{K_n}{J_{Ln}} & 0 & -\frac{K_n}{J_{Ln}} \\ -K_4 & 0 & 1 & 0 \end{pmatrix} \cdot \begin{pmatrix} \tilde{x}_1 \\ \tilde{x}_2 \\ \tilde{x}_3 \\ \tilde{x}_4 \end{pmatrix} + \begin{pmatrix} \frac{K_{tm}}{J_{Mn}} \\ 0 \\ 0 \\ 0 \end{pmatrix} \cdot i + \begin{pmatrix} K_1 \\ K_2 \\ K_3 \\ K_4 \end{pmatrix} \cdot y \qquad (22)$$

In the state equation (22), $\tilde{x}_1$, $\tilde{x}_2$, $\tilde{x}_3$, $\tilde{x}_4$ are the estimated values of the state variables $x_1, x_2, x_3, x_4$; and $\tilde{x}_1'$, $\tilde{x}_2'$, $\tilde{x}_3'$, $\tilde{x}_4'$ are their derivatives. Further, $J_{Mn}$ is the nominal value of a motor inertia $J_M$, $J_{Ln}$ is the nominal value of an arm inertia $J_L$, $K_n$ is the nominal value of a spring constant K of a low-rigidity part, $K_{tm}$ is the nominal value of a motor torque constant $K_t$, and $K_1, K_2, K_3, K_4$ are observer parameters.

The transfer function from the current command "i" for the controlled system 10 to the arm-end position $\theta_L$ is represented by the following equation (23):

$$\frac{\theta_L}{i} = \frac{K_t}{(J_L + J_M) \cdot s^2} \cdot \frac{1}{\frac{J_L \cdot J_M}{(J_L + J_M) \cdot K} \cdot s^2 + 1} \qquad (23)$$

Accordingly, the transfer function $G_m(s)$ of the reference model 14 is represented by the following equation (24):

$$G_m(s) = \frac{K_{tm}}{J_m \cdot s^2} \cdot \frac{1}{\frac{1}{\omega_n^2} \cdot s^2 + 2 \cdot \frac{\zeta}{\omega_n} \cdot s + 1} \qquad (24)$$

The relative order of the transfer function $G_m(s)$ of the above reference model 14 is four, so that the transfer function H(s) of the compensator 16 represented by the following equation (25) is adopted. The filter parameters in the compensator 16 are selected so as to stabilize the system.

$$H(s) = G_m(s)^{-1} \cdot F(s) = \frac{J_m \cdot s^2}{K_{tm}} \cdot \frac{\frac{1}{\omega_n^2} \cdot s^2 + 2 \cdot \frac{\zeta}{\omega_n} \cdot s + 1}{a_4 \cdot s^4 + a_3 \cdot s^3 + a_2 \cdot s^2 + a_1 \cdot s + 1} \qquad (25)$$

In this connection, if the natural angular frequency $\omega_n$ of the reference model 14 is sufficiently higher than the response frequency of a position control loop, a transfer function represented by the following equation (26) can be used as the controlled system 10 when designing the position loop.

$$G(s) = \frac{K_{tm}}{J_m \cdot s^2} \qquad (26)$$

Figure 19:
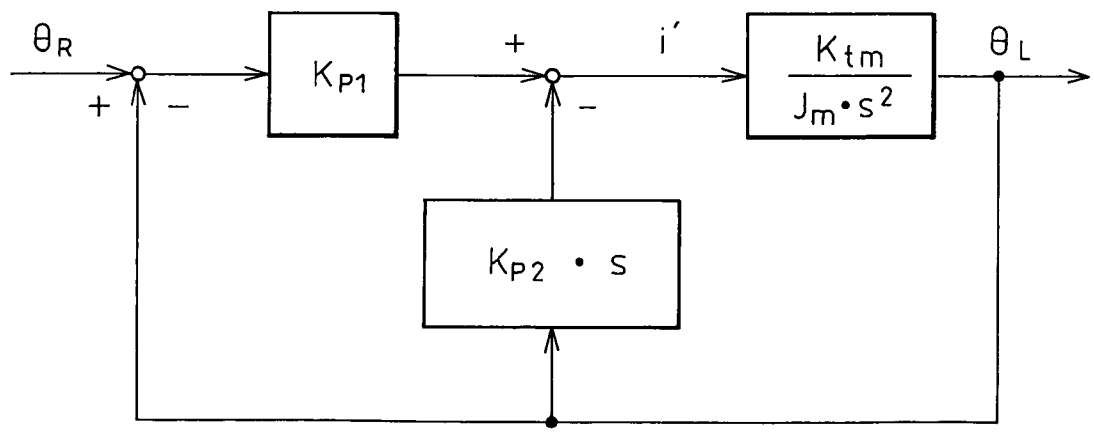
FIG. 19 is a block diagram showing a simplified model of a servo loop from a position command to an arm-end position, in a third control example performed by the control device of FIG. 2.

Provided that the controlled system 10 is the above transfer function G(s), a position control gain is determined using a simplified model shown by the block diagram of FIG. 19 (a P-D controller is used to facilitate stabilization of a loop transfer function). In this connection, $\theta_R$ is a position command, $K_{p1}$ is a position-loop proportional gain, and $K_{p2}$ is a position-loop derivative gain.

The transfer function of the simplified model of FIG. 19 is represented by the following equation (27):

$$\frac{\theta_L}{\theta_R} = \frac{K_{v1} \cdot K_{tm}}{J_m \cdot s^2 + K_{v2} \cdot K_{tm} \cdot s + K_{v1} \cdot K_{tm}} = \frac{1}{\frac{J_m}{K_{v1} \cdot K_{tm}} \cdot s^2 + \frac{K_{v2}}{K_{v1}} \cdot s + 1} \quad (27)$$

In the equation (27), if the position-loop proportional gain $K_{p1}$ is determined as shown by the equation (28) and the position-loop derivative gain $K_{p2}$ is determined as shown by equation (29), the transfer function of the equation (27) is rewritten as the following equation (30), which leads to a certain stable response. In the equations (28) to (30), $\omega_c$ is the natural angular frequency of a position control response, and $\zeta_c$ is a damping constant.

$$K_{v1} = \omega_c^2 \cdot \frac{J_m}{K_{tm}} \quad (28)$$

$$K_{v2} = 2 \cdot \zeta_c \cdot \omega_c \cdot \frac{J_m}{K_{tm}} \quad (29)$$

$$\frac{\theta_L}{\theta_R} = \frac{1}{\frac{1}{\omega_c^2} \cdot s^2 + 2 \cdot \frac{\zeta_c}{\omega_c} \cdot s + 1} \quad (30)$$

Figure 20:
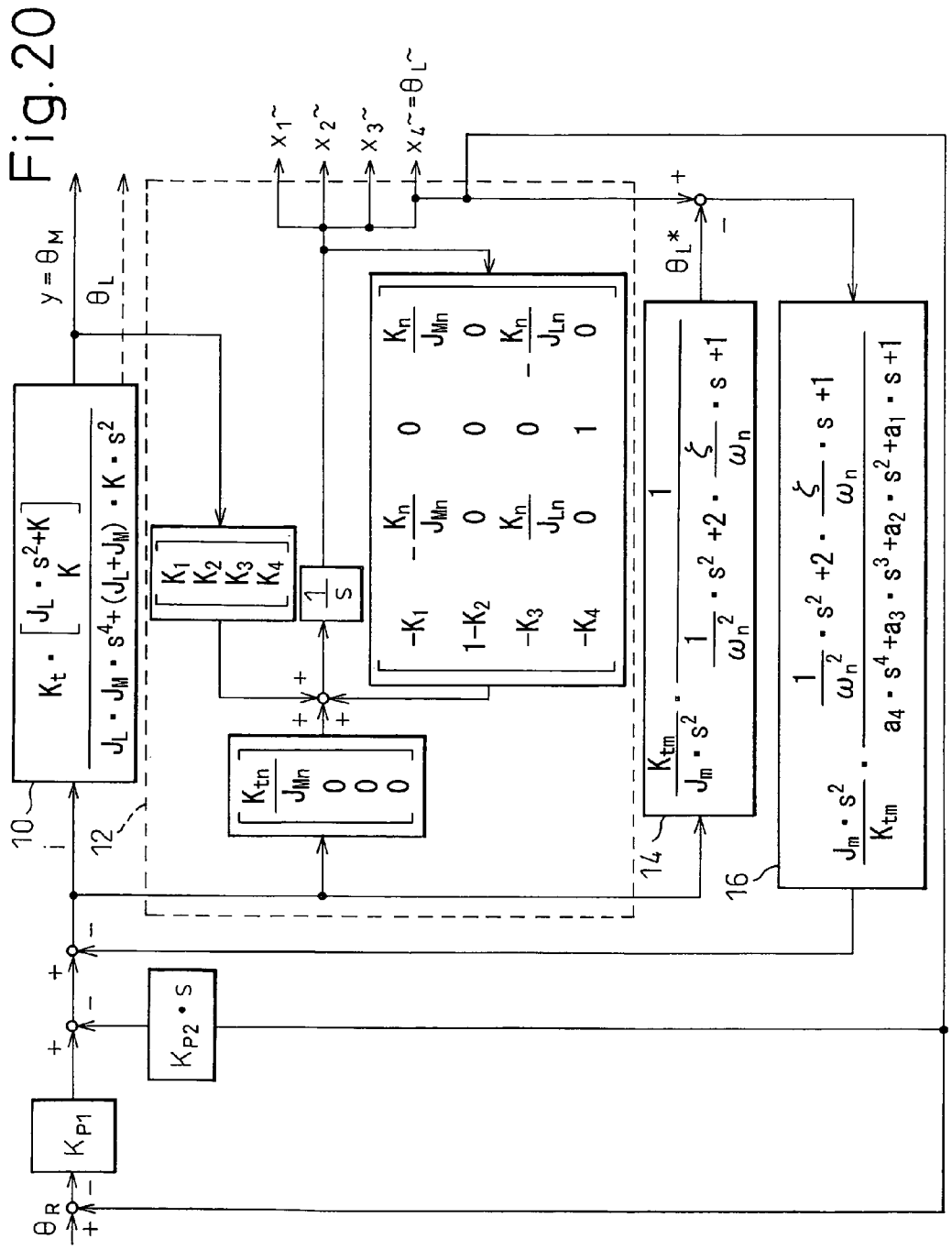
FIG. 20 is a block diagram showing a configuration from a position command to an arm-end position in the third control example.

FIG. 20 shows a block diagram from the position command $\theta_R$ to the arm-end position $\theta_L$ in the case where the state variable of the controlled system 10 is the arm-end position $\theta_L$.

As is apparent from the above description, according to the present invention, it is possible to control the controlled system as commanded, and to ensure a stable response free from vibration. It is also possible to make the response of the controlled system equal to the response of the reference model, and thereby to design the feedback loop by regarding the reference model as the controlled system, which makes it possible to easily design and adjust the gain. Furthermore, there is no need to provide a vibration detector directly on the controlled system, so that the present invention is particularly effective in the control of a robot arm, in which the end portion of the robot arm is usually not provided with a sensor.

While the invention has been described with reference to specific preferred embodiments, it will be understood by those skilled in the art that various changes and modifications may be made thereto without departing from the spirit and scope of the following claims.

The invention claimed is:

1. A control device comprising:
   a state-variable estimating section for estimating a state variable of a controlled system in a machine and outputting an estimated state variable;
   a reference model for outputting an ideal controlled variable for the controlled system;
   a compensator for calculating a compensation value for correcting a control input for the controlled system, based on a difference between said estimated state variable and said ideal controlled variable; and
   a feedback control section for determining said control input, based on a deviation between a desired command value and one of said estimated state variable and said ideal controlled variable;
   wherein a corrected control input obtained by correcting said control input determined through said feedback control section by using said compensation value calculated through said compensator is input to the controlled system as well as to said state-variable estimating section and said reference model.

2. A control device as set forth in claim 1, wherein said state variable comprises any one of acceleration, speed and position; and wherein said compensation value comprises a compensation current or torque.

3. A control device as set forth in claim 2, wherein said controlled system comprises a two-inertia system; and wherein said state variable comprises any one of the acceleration, speed and position at a load part in said controlled system.

4. A control device as set forth in claim 1, wherein a transfer function of said compensator has an inverse characteristic reverse to a characteristic of a transfer function of said reference model.

5. A control device as set forth in claim 4, wherein said transfer function of said compensator includes a filter incorporated to said inverse characteristic.

6. A control device as set forth in claim 1, wherein the machine comprises a robot.

* * * * *